(12) United States Patent
Schilling et al.

(10) Patent No.: US 10,019,626 B2
(45) Date of Patent: Jul. 10, 2018

(54) METHOD FOR AUTHENTICATING A SECURITY ELEMENT, AND OPTICALLY VARIABLE SECURITY ELEMENT

(71) Applicants: LEONHARD KURZ Stiftung & Co. KG, Furth (DE); OVD Kinegram AG, Zug (CH); adorsys GmbH & Co. KG, Nuremberg (DE)

(72) Inventors: Andreas Schilling, Hagendorn (CH); Uwe Frieser, Buchenbach (DE); Benno Schmitzer, Zirndorf (DE); Wayne Robert Tompkin, Baden (CH); Jurgen Metzger, Nuremberg (DE); Ralf Wondratschek, Dornburg-Camburg OT Camburg (DE); Alexander Gugel, Wendelstein (DE)

(73) Assignees: LEONHARD KURZ STIFTUNG & CO. KG, Furth (DE); OVD KINEGRAM AG, Zug (CH); ADORSYS GMBH & CO. KG, Nuremberg (DE)

( * ) Notice: Subject to any disclaimer, the term of this patent is extended or adjusted under 35 U.S.C. 154(b) by 12 days.

(21) Appl. No.: 15/100,769

(22) PCT Filed: Nov. 28, 2014

(86) PCT No.: PCT/EP2014/075909
§ 371 (c)(1),
(2) Date: Jun. 1, 2016

(87) PCT Pub. No.: WO2015/082332
PCT Pub. Date: Jun. 11, 2015

(65) Prior Publication Data
US 2016/0307035 A1    Oct. 20, 2016

(30) Foreign Application Priority Data

Dec. 2, 2013 (DE) .................. 10 2013 113 340
Jul. 18, 2014 (DE) .................. 10 2014 110 103

(51) Int. Cl.
*G06K 9/00* (2006.01)
*G07D 7/128* (2016.01)
(Continued)

(52) U.S. Cl.
CPC ......... *G06K 9/00483* (2013.01); *B42D 25/23* (2014.10); *B42D 25/24* (2014.10);
(Continued)

(58) Field of Classification Search
CPC ........ B42D 25/00; B42D 25/21; B42D 25/23; B42D 25/24; B42D 25/29; B42D 25/30;
(Continued)

(56) References Cited

U.S. PATENT DOCUMENTS

| | | | |
|---|---|---|---|
| 7,387,249 B2 * | 6/2008 | Hudson | G06K 19/06028 235/384 |
| 8,351,087 B2 * | 1/2013 | Amidror | B44F 1/10 358/3.28 |

(Continued)

FOREIGN PATENT DOCUMENTS

| | | |
|---|---|---|
| DE | 102004056007 | 5/2006 |
| DE | 102011077904 | 12/2012 |

(Continued)

OTHER PUBLICATIONS

Qiang Wu et al., "Car Plate Detection Using Cascaded Tree-Style Learner Based on Hybrid Object Features", AVSS'06, IEEE, 2006.
Taiwanese Office Action dated Mar. 23, 2018.

*Primary Examiner* — Jose Couso
(74) *Attorney, Agent, or Firm* — Hoffmann & Baron, LLP

(57) ABSTRACT

The invention relates to a method for authenticating an optically variable security element (1), in particular a diffractive security element, with the steps:

a) capturing an image sequence with at least one individual image of the security element (1) by means of a sensor (31), in particular a hand-held device (3), preferably a smartphone, tablet or a PDA;
b) checking whether at least one predetermined item of optical information is present in at least one individual image of the image sequence.

69 Claims, 16 Drawing Sheets

(51) Int. Cl.
| | | |
|---|---|---|
| B42D 25/30 | (2014.01) | |
| G07D 7/20 | (2016.01) | |
| B42D 25/23 | (2014.01) | |
| B42D 25/24 | (2014.01) | |
| B42D 25/29 | (2014.01) | |
| B42D 25/324 | (2014.01) | |
| B42D 25/328 | (2014.01) | |
| B42D 25/342 | (2014.01) | |
| B42D 25/351 | (2014.01) | |
| B42D 25/369 | (2014.01) | |
| B42D 25/373 | (2014.01) | |
| B42D 25/378 | (2014.01) | |
| G06K 9/22 | (2006.01) | |
| G06K 9/46 | (2006.01) | |
| G06K 9/62 | (2006.01) | |
| G06T 5/00 | (2006.01) | |
| G06T 5/20 | (2006.01) | |
| G06T 7/13 | (2017.01) | |
| G07D 7/00 | (2016.01) | |
| G07D 7/206 | (2016.01) | |

(52) U.S. Cl.
CPC ............ *B42D 25/29* (2014.10); *B42D 25/30* (2014.10); *B42D 25/324* (2014.10); *B42D 25/328* (2014.10); *B42D 25/342* (2014.10); *B42D 25/351* (2014.10); *B42D 25/369* (2014.10); *B42D 25/373* (2014.10); *B42D 25/378* (2014.10); *G06K 9/22* (2013.01); *G06K 9/4604* (2013.01); *G06K 9/6256* (2013.01); *G06T 5/002* (2013.01); *G06T 5/20* (2013.01); *G06T 7/13* (2017.01); *G07D 7/003* (2017.05); *G07D 7/128* (2013.01); *G07D 7/206* (2017.05); *G07D 7/2083* (2013.01); *G06T 2207/20021* (2013.01); *G06T 2207/20081* (2013.01); *G06T 2207/30176* (2013.01)

(58) Field of Classification Search
CPC .. B42D 25/309; B42D 25/313; B42D 25/318; B42D 25/324; B42D 25/328; B42D 25/333; B42D 25/342; B42D 25/351; B42D 25/369; B42D 25/373; B42D 25/378; B42D 25/382; B42D 25/387; B42D 25/41; B42D 25/44; B42D 25/45; B42D 25/46; B42D 25/48; B42D 25/435; B42D 2033/20; B42D 2033/10; B42D 2033/22; B42D 2033/30; B42D 2035/24; B42D 2035/02; B42D 2035/12; B42D 2035/20; B42D 2035/44; B42D 2035/06; B42D 2035/34; B42D 2035/50; G06K 9/22; G06K 9/46; G06K 9/209; G06K 9/2063; G06K 9/00483; G06K 9/4604; G06K 9/6256; G06K 9/18; G06K 19/00; G06K 19/02; G06K 19/077; G06K 19/07716; G06K 19/07718; G06K 19/14; G06K 17/00; G06K 2009/0059; G06K 2017/0041; G06T 1/0021; G06T 1/0028; G06T 5/002; G06T 7/13; G06T 2201/0051; G06T 2207/20021; G06T 2207/20081; G06T 2207/30176; G07D 7/12; G07D 7/20; G07D 7/003; G07D 7/005; G07D 7/0073; G07D 7/0086; G07D 7/121; G07D 7/128; G07D 7/206; G07D 7/2083; B41M 3/008; B41M 3/10; B41M 3/14; B41M 3/144; G03H 1/0011; G03H 1/22; G03H 1/26; G03H 1/265; G03H 2001/2244; G03H 2001/2247; G03H 2001/2281; G03H 2001/2223; G03H 2001/2273; G03H 2001/34; G03H 2210/33; G03H 2227/06; G06Q 20/341; G06Q 20/40145; G07F 7/1008; G07C 9/00031; G07C 9/0087; G07C 2209/41; H04N 1/32133; H04N 1/32144; H04N 2201/3233; H04N 2201/3236; H04N 2201/327; H04N 2201/3271; H04N 21/25816; H04N 21/25875; H04N 21/4367; H04N 21/4415; H01L 29/7436

See application file for complete search history.

(56) References Cited

U.S. PATENT DOCUMENTS

| | | | | |
|---|---|---|---|---|
| 8,610,976 | B1* | 12/2013 | Cook | G06T 5/50 |
| | | | | 358/463 |
| 9,015,084 | B2* | 4/2015 | Thieberger | G06N 99/005 |
| | | | | 706/12 |
| 9,177,433 | B2* | 11/2015 | Holmes | G07D 7/0006 |
| 9,592,701 | B2* | 3/2017 | Fischer | B42D 25/328 |
| 2005/0161512 | A1 | 7/2005 | Jones et al. | |
| 2006/0157559 | A1* | 7/2006 | Levy | G06K 17/00 |
| | | | | 235/380 |
| 2007/0133862 | A1* | 6/2007 | Gold | G06K 9/0014 |
| | | | | 382/149 |
| 2007/0201720 | A1* | 8/2007 | Rodriguez | B41M 3/10 |
| | | | | 382/100 |
| 2007/0278515 | A1 | 12/2007 | Miyazaki et al. | |
| 2007/0279515 | A1 | 12/2007 | Miyazaki et al. | |
| 2008/0247663 | A1 | 10/2008 | Jacobsen | |
| 2010/0177390 | A1* | 7/2010 | Hutchins | G02B 5/1842 |
| | | | | 359/572 |
| 2011/0188713 | A1 | 8/2011 | Chin et al. | |
| 2012/0281077 | A1* | 11/2012 | Canero Morales | G07D 7/20 |
| | | | | 348/61 |
| 2013/0223674 | A1 | 8/2013 | Eckel et al. | |
| 2014/0212041 | A1 | 7/2014 | Komarov et al. | |
| 2015/0048167 | A1* | 2/2015 | Russell | G06K 7/0004 |
| | | | | 235/462.22 |

FOREIGN PATENT DOCUMENTS

| | | |
|---|---|---|
| DE | 102011082028 | 3/2013 |
| DE | 102011121566 | 6/2013 |
| EP | 2293247 | 3/2011 |

* cited by examiner

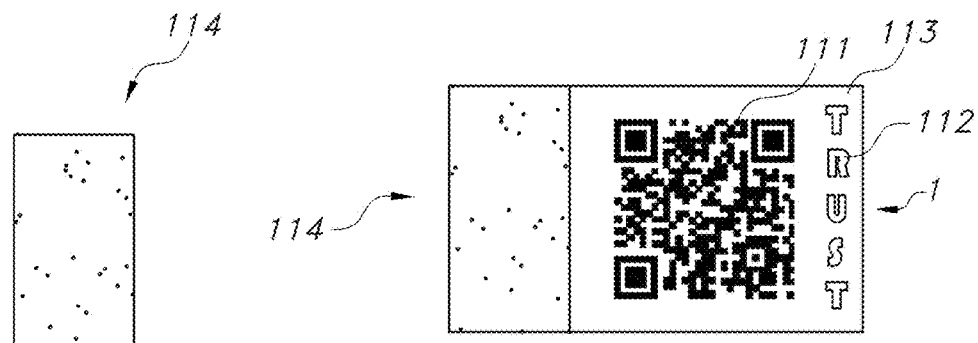
FIG. 28B
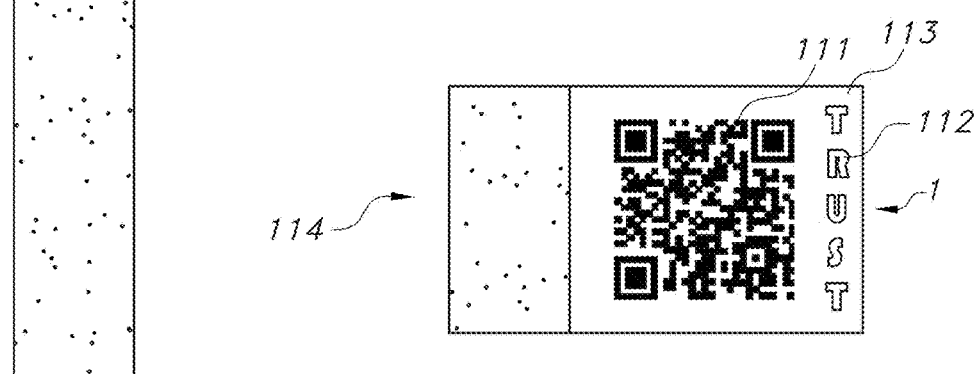
FIG. 28C
FIG. 28A
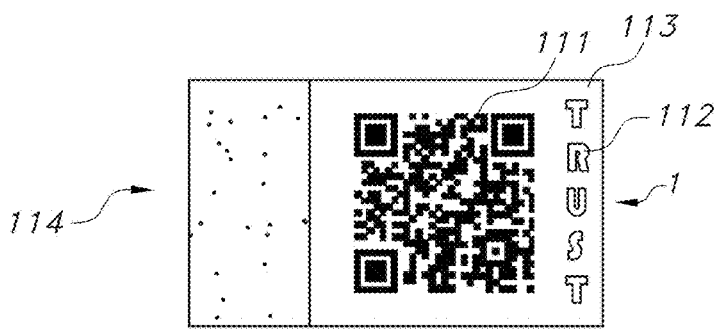
FIG. 28D

METHOD FOR AUTHENTICATING A SECURITY ELEMENT, AND OPTICALLY VARIABLE SECURITY ELEMENT

This application claims priority based on an International Application filed under the Patent Cooperation Treaty, PCT/EP2014/075909, filed on Nov. 28, 2014, German Application Nos. DE 102013113340.1, filed on Dec. 2, 2013 and DE 102014110103.0, filed on Jul. 18, 2014.

BACKGROUND OF THE INVENTION

The invention relates to a method for authenticating a security element, a device, a computer program product and a server for carrying out the method, as well as an optically variable security element for use with such a method.

Optically variable security elements are used frequently in order to authenticate documents, banknotes or products and protect them against forgery. As these security elements generate different optical effects at different observation and/or illumination angles, they cannot be easily reproduced by photocopying, duplication or simulation.

Such security elements usually have a defined optical design, which can be verified visually by a simple observation. Forgeries of high quality which only differ in a few details from the original cannot, however, always be recognized in a reliable manner with a visual inspection. If a multitude of documents or products have to be authenticated, for example a large quantity of objects such as banknotes, documents or products, a visual inspection is also not expedient. A visual inspection is often also not sufficient, because often the user does not know which specific security element with which optical and other security functions is actually allocated to the respective object at all. Because of the multitude of existing security elements on all the possible different objects, it is often difficult to recall precise knowledge about the specifically present security element and its specific properties from memory in each case.

Furthermore, systems for automatic authentication of security elements are known. For this, the security element is usually illuminated with a laser at a predetermined angle and the diffracted light is detected at one or more predetermined observation angles by means of appropriate sensors. These are stationary systems which are suitable for checking a large quantity of in particular identical objects in a short time.

However, it is often also necessary to authenticate the security elements of individual objects impromptu in-situ. Such stationary systems are not suitable for this.

SUMMARY OF THE INVENTION

The object of the present invention is thus to improve the authentication of security elements.

This object is achieved by a method with the features of claim 1, by a device with the features of claim 60, a computer program product with the features of claim 61, a server with the features of claim 62, as well as by a security element with the features of claim 63.

In such a method for authenticating an optically variable security element, in particular a diffractive security element, the following steps are carried out:
a) capturing an image sequence with at least one individual image of the security element by means of a sensor, in particular a hand-held device, preferably a smartphone, tablet or PDA, or of an "augmented reality device" such as e.g. "Google Glass";
b) checking whether at least one predetermined item of optical information is present in at least one individual image of the image sequence.

An optically variable security element which comprises at least one predetermined item of optical information which can be automatically detected using a sensor of a hand-held device, in particular of a smartphone or PDA, or "augmented reality device" is suitable in particular for carrying out such a method.

This makes it possible to check the authenticity of a security element independently of fixed devices at any time and at any place in a more reliable manner than would be possible with a simple visual inspection. Documents or products protected with such a security element and authenticated using such a method are thus protected particularly well against imitation. By authentication is meant the recognition of an original security element and the differentiation thereof from a forgery.

Optically variable security elements are also known as optically variable devices (OVDs). They are elements which display different optical effects under different observation or illumination conditions. An optically variable security element preferably has an optically active relief structure, for example a diffractive relief structure, in particular a hologram or a Kinegram®, a zero-order diffraction structure, a macrostructure, in particular a microlens array with a refractive action or a microprism array, a mat structure, in particular an isotropic mat structure or an anisotropic mat structure, linear or crossed sinusoidal grating structures or binary grating structures, asymmetrical blazed grating structures, a superimposition of a macrostructure with a diffractive and/or mat microstructure, an interference layer system, which preferably generates a color shift effect dependent on the viewing angle, a layer containing liquid crystals, in particular cholesteric liquid crystals and/or a layer containing optically variable pigments, for example thin-film layer pigments or liquid crystal pigments. In particular, through combinations of one or more of the above-named elements, an OVD with a particularly high level of protection against forgery can be provided, because a forger has to reproduce this specific combination, which substantially increases the degree of technical difficulty of the forgery.

By a hand-held device is intended to mean any transportable device which can be held by a user while the method is carried out or can be worn by a user and can be manipulated manually. In addition to the smartphones, tablets or PDAs already mentioned, other devices can also be used, of course. For example, it is possible, instead of the named multipurpose devices, also to use devices which are designed specifically only for carrying out this method. For example, an existing document scanner can be adapted for carrying out the method according to the invention by adapting its software and/or hardware.

As a rule, the sensor used is a digital electronic sensor, for example a CCD sensor (CCD=charge-coupled device). CCD arrays, thus arrangements of CCDs in which individual CCDs are arranged in a two-dimensional matrix, are preferably used. The individual images generated by such a sensor are then present in the form of a pixel matrix, wherein each pixel corresponds to an individual CCD of the sensor. The CCD sensor preferably has, in each case, separate sensors for the colors red, green and blue (RGB), whereby these individual colors or colors mixed from them are particularly easy to detect.

For many applications, it is preferred to provide an OVD which can be checked using a multitude of available hand-held devices. Due to the turbulent technical advancement, however, there are marked technical differences between individual hand-held devices, in particular in computational power, optical imaging quality of the sensor (e.g. optical resolution). In some cases, therefore, it is essential to define, from the multitude of hand-held devices, a subselection with which the method according to the invention can be carried out.

The image sequence preferably comprises a plurality of individual images of the security element, in particular comprises more than 2 individual images of the security element. Furthermore, it is preferred if each individual image has more than 480×320 pixels, in particular more than 1920×1280 pixels.

The image sequence can be a plurality of discretely created individual images which have no temporal connection, but it can also be a film, thus consist of individual images which are captured at predetermined time intervals, in particular at an acquisition frequency of from 5 to 60 images per second.

In a preferred embodiment, in step b) at least two individual images of the image sequence are used to check whether the security element comprises an optically variable structure. This makes it possible to distinguish an authentic security element from a copy (e.g. a color copy), which only has a static—i.e. not optically variable—representation of the at least one predetermined item of optical information. It is advantageous here to explicitly check that the respective individual image belongs or to define a predetermined time interval between two individual images as a condition, in order that a user cannot use two separate individual images for deception in order to fake an optical variability.

In step b) it is preferably first checked whether a predetermined object is present in at least one individual image of the image sequence. This object can be the entire design of the security element itself or only represent one partial aspect thereof. This ensures that the at least one individual image actually represents the security element to be authenticated. If this is not the case, further investigations can be dispensed with and the user can be notified that the images captured by means of the sensor are unsuitable for the purpose of authentication and must possibly be captured again.

Alternatively, the user can be prompted to carry out other steps for identification or authentication. For example, the user can be prompted to capture an image of a barcode or other machine readable region (e.g. the MRZ (MRZ=machine readable zone) of an ID document) present (e.g. printed) on the object or a specific partial region of the packaging or of a document and to send this to an official or commercial examining body for further analyses. These additionally captured images can then be linked with further items of information and, optionally, using this yet further instructions for identification or authentication can be conveyed to the user, e.g. via an Internet connection.

It is expedient if an image recognition algorithm, in particular a Haar cascade algorithm, is used to check whether the predetermined object is present. Such algorithms allow a rapid and reliable classification of image contents.

The Haar-cascade algorithm is based on the evaluation of a multitude of so-called "Haar-like" features in the individual image. These are structures which are related to Haar wavelets, thus square wave trains with a predetermined wavelength. In two dimensions, these are simply neighboring, alternating light and dark rectangular regions in the image. By shifting a rectangular mask over the individual image, the "Haar-like" features present are ascertained. The "Haar-like" features present are then compared with those which are supposed to be present in the object to be recognized. This can take place via a filter cascade.

The Haar cascade algorithm has the advantage of requiring particularly little computing time and few computer resources. However, it is also possible to use other image recognition algorithms.

To check whether the predetermined object is present, a comparison of the at least one individual image with a previously acquired training data set is preferably carried out by means of the image recognition algorithm. This can take place within the framework of the described Haar-cascade algorithm, but also by means of other algorithms.

The image recognition thus advantageously is based on a form of computational learning. The algorithm is not provided with any specific parameters, using which a classification of the image content is carried out, but rather the algorithm learns these parameters using the training data set.

To acquire the training data set, a plurality of images is preferably created, wherein a first subset of the images in each case has the predetermined object and a second subset of the images in each case does not have the predetermined object, and wherein each image of the first subset is allocated all the respective image coordinates of the features to be recognized of the predetermined object.

Using the first and second subsets as well as the allocated image coordinates, a training of the image recognition algorithm is then preferably carried out. Through this, the algorithm learns to classify the images correctly and, where appropriate, to ignore disruptive factors intentionally introduced into the training data set, such as for example reflections in the images, random shading or the like. A rapid and reliable image recognition is hereby made possible.

Furthermore, it is expedient if, during the checking of whether the at least one predetermined item of optical information of the optically variable security element is present, the contour of the predetermined object is ascertained from at least one individual image of the image sequence.

Compared with the above-described simple image recognition, which only supplies a yes/no classification or a probability for whether the predetermined object is present in the individual image, additional items of information are thus provided. In particular, the presence or absence of detailed features of the object can be checked using the ascertained contour. This supplies further items of information which can contribute to the authentication of the security element.

The predetermined item of information, which serves for authentication, can thus relate only to a detail of the entire object. This makes it possible to also conceal visually recognizable security features, as it were, in the design of the security element.

An edge detection algorithm, in particular a Canny algorithm, is preferably executed to ascertain the contour. The Canny algorithm is a particularly robust algorithm for edge detection and supplies rapid and reliable results.

To apply the Canny algorithm to color images, these must first be converted into shades of gray. In grayscale images edges are characterized by strong fluctuations in lightness, i.e. a strong contrast, between neighboring pixels and can thus be described as discontinuities of the grayscale value function of the image.

As such discontinuities can also be caused by image noise, it is expedient if during the execution of the edge detection algorithm a noise filtering is carried out, in particular by means of a Gaussian filter with a preferred kernel size of from 3 to 7.

By kernel is meant here a convolution matrix which is applied to the item of image information. The convolution matrix of the Gaussian filter corresponds to normal distribution and acts as a low-pass filter. The grayscale value of a filtered pixel thus corresponds to the average of the grayscale values of the surrounding pixels weighted with the normal distribution up to a maximum distance defined by the kernel size. Smaller structures forming due to noise are lost, while the main structures of the imaged object are preserved.

Preferably, during the execution of the edge detection algorithm, an edge detection is carried out by applying a Sobel operator in at least one preferred direction of the at least one individual image, preferably in two orthogonal preferred directions of the at least one individual image.

The Sobel operator is likewise a convolution operator, which acts as a discrete differentiator. By convolving the image with the Sobel operator, the partial derivations of the grayscale value function in the two orthogonal preferred directions are obtained. The edge direction and edge strength can then be determined from this.

It is further preferred if, during the execution of the edge detection algorithm, an edge filtering is carried out. This can take place for example by means of a so-called "non-maximum suppression", which ensures that only the maxima along one edge are preserved, with the result that an edge perpendicular to its direction of extension is not wider than one pixel.

Furthermore, a threshold-based ascertaining of the image coordinates of the contour of the object is preferably carried out during the execution of the edge detection algorithm. It is thus ascertained from what edge strength a pixel is to be classed with an edge.

For this, for example, a hysteresis-based method can be used. Two threshold values $T_1$ and $T_2$ are established for this, wherein $T_2$ is greater than $T_1$. A pixel with an edge strength greater than $T_2$ is regarded as a constituent of an edge. All pixels with an edge strength greater than $T_1$ connected with this pixel are likewise assigned to this edge.

The image coordinates of all pixels belonging to an edge of the object in the investigated individual image are thus obtained. These can be analyzed further, for example in order to recognize simple geometric shapes.

It is further expedient if, based on the ascertained image coordinates of the contour, at least one individual image of the image sequence is divided into two or more partial regions and for each partial region the ascertained image coordinates of the contour are compared with corresponding target coordinates and, from this, in particular the presence and/or the size and/or the relative position of predetermined contours is ascertained. It can be advantageous here to adapt the division into partial regions, or the delimitation of the partial regions, to the specific design of the security element present and thus to analyze particularly interesting partial regions of the design in isolation.

These predetermined contours can correspond to the predetermined item of optical information, with the result that it becomes possible to accurately check whether the individual image matches the item of optical information of the genuine security element.

In order to authenticate a security element investigated in this way as genuine, there does not necessarily need to be absolute matching; it is also possible to specify tolerance ranges for admissible deviations. Deviations need not necessarily indicate a forgery, as optical artifacts, perspective distortions, wear or dirtying of the security document during use or similar effects which can occur during the capture of the individual image can also impair the matching with the reference image of the original. In order to reduce such deviations, it is advantageous if aids are provided to make it easier for the user to carry out the method according to the invention. For example, one or more orientation frames can be imaged on the screen of the hand-held device, into which the security element or parts of the motif are to be placed for the recognition. Alternatively or in addition to this, further optical aids or displays can be provided in order to reduce, for example, perspective distortions and/or contortions. For example, these can be movable crosshairs or other elements, which are to be positioned relative to each other by means of movement of the hand-held device. Although this makes it more difficult for the user to operate the hand-held device, it can improve the recognition rate for the security element.

It is advantageous if at least one partial region of the individual image, which is positioned in a predetermined location relative to the contour of a predetermined object, and which comprises at least one pixel and/or at least one pixel group of the individual image, is selected and at least one property of the at least one pixel and/or of the at least one pixel group of the at least one selected partial region is compared with a corresponding target value.

The predetermined item of optical information or also parts thereof can thus also be analyzed at pixel level. This makes it possible to use very subtle details of the design of the security element for its authentication. For example, even targeted deviations in color or lightness in very small regions of the security element which are imaged only as individual pixels in the capture of the image sequence can be used for authentication. This very small region can be formed particularly inconspicuously so that the potential forger has no knowledge about the particular significance of this small region.

It is expedient if the location of the at least one partial region of the individual image is determined using the ascertained image coordinates of the contour. In this way, small details of the security element can be discovered and investigated reliably using their relative position with respect to the contour.

The at least one partial region preferably comprises less than 50% of the surface area of the individual image.

It is further preferred if, during the capture of the image sequence in step a), an angle between the sensor and the security element and/or an angle between a light source (e.g. the flash of the hand-held device) and the security element is changed. By the angle between a light source and the security element is meant the angle of incidence of the light which illuminates the OVD, relative to the surface normal of the OVD. If the light source of the hand-held device is used, the angle of incidence of the light coincides relatively precisely with the optical axis of the sensor (running from the OVD through the lens thereof to the image sensor).

As it is an optically variable security element, its detectable/measurable appearance also changes when the observation angle and/or illumination angle is altered. In this way it can be verified firstly whether the security element detected in the image sequence is actually optically variable or whether it is a static copy of an OVD.

Furthermore, it is thus made possible to link the predetermined item of optical information with the optical variability. For example, one part of the predetermined item of optical information can become visible at a first observation angle and another part of the predetermined item of optical information can become visible at a second observation angle. A static copy of such a security element would never display the complete item of information, with the result that the security element cannot be copied conventionally, in particular by means of printing technology.

It is further preferred if, during the capture of the image sequence in step a), by means of a position sensor of the hand-held device, for each individual image of the image sequence, a relative position of the hand-held device with respect to a predetermined position is recorded and allocated to the respective individual image.

At least if the relative position of the security element with respect to the predetermined position is known, the observation angle can thus be accurately determined. This is possible, for example, if the security element is placed down on a flat, in particular horizontal, surface during the capture of the image sequence. Customary position sensors or motion sensors of smartphones or the like can then determine the relative orientation of the smartphone with respect to this surface and thus to the security element during the capture of the image sequence without problems. The accuracy of customary position sensors or motion sensors moves in particular in a range of +/−1° with prior calibration of the sensor concerned and in particular in a range of +/−5° without prior calibration of the sensor concerned. It is to be borne in mind that such customary position sensors or motion sensors are only able to detect their relative position with respect to a horizontal or vertical, but not their relative position with respect to the security element. The user should therefore preferably be instructed to bring the security element into a position which is, as accurately as possible, horizontal or vertical, in order to make possible a recognition which is as accurate as possible.

To check whether the security element comprises an optically variable structure, in step b) preferably two individual images of the image sequence which have been captured at different observation and/or illumination angles and/or under different illumination conditions are compared.

If these individual images differ to a predetermined extent in one or more parameters, the presence of an optically variable structure can be assumed. If this is not the case, it is most likely that a static copy is present.

It is advantageous if, to check whether the security element comprises an optically variable structure, in each case corresponding pixels and/or pixels groups, in particular of the partial regions, of the individual image are compared.

In this way, the identity or non-identity of the individual images can be determined without a large outlay on processing.

It is expedient to check here whether the respective pixels and/or pixel groups, in particular of the partial regions, of the individual images differ in terms of a color value and/or lightness value.

To check the identity of the individual images, therefore, it is not necessary to recognize any structures at all in the individual images; it is sufficient to observe OVD-specific changes on the basis of the changed observation or illumination angle at pixel level. This is particularly efficient and saves computing time. Instructions can preferably be conveyed to the user about how the user should change the observation or illumination angle in order to produce specific optically variable changes, in particular by tilting and/or rotating.

The predetermined item of optical information preferably comprises one or more items of information selected from the group: object, contour of the object, part of the contour of the object, properties of the pixels and/or pixel group of the at least one selected partial region.

The predetermined item of optical information can thus be integrated into the design of the security element in many different ways. In particular, the named options can also be combined. This makes it possible, for example, to represent an item of optical information which, although it can be visually observable, is hidden or distributed in the overall design such that it is not perceived as an item of information in itself. It is thus difficult for a forger to recognize what precisely is actually used to authenticate the security element, with the result that forgeries are particularly difficult to produce.

For the authentication of the security element, it is particularly expedient if one or more items of information selected from the group: object, contour of the object, part of the contour of the object, properties of the pixels and/or pixel group of the at least one selected partial region, are compared with target values, in order to ascertain whether the predetermined item of optical information is present.

Here too, tolerances for the target values can again be allowed in order to admit deviations due to photographic artifacts and the like. Such tolerances are advantageous, because OVDs generally react sensitively to slight differences in the observation and illumination conditions.

It is further advantageous if, during the capture of the image sequence in step a), at least one image of the image sequence is captured using flash and at least one image of the image sequence is captured without using flash.

It is advantageous if the at least one predetermined item of optical information is or comprises a visually recognizable item of information.

This allows a visual inspection to be carried out in addition to the described automatic authentication, should there presently be no possibility for automatic checking. By visually recognizable is to be meant that the item of information can be resolved by the human eye at a customary observation distance of approximately 30 cm, preferably from 10 cm to 50 cm, and at a customary illumination level of 1000 lx, preferably from 10 lx to 100000 lx.

It is possible that the at least one predetermined item of optical information is or comprises a symbol, logo, image, sign, alphanumeric character or a number.

The named structures can also be integrated into further designs and are particularly simple to recognize and also to verify visually.

It is further possible and advantageous that the at least one predetermined item of optical information is or comprises a partial element of a symbol, logo, image, sign, alphanumeric character or a number.

In this way, the predetermined item of optical information can be integrated into a design in a particularly subtle and inconspicuous manner. For example, an alphanumeric character can have a slight change or deviation with respect to the typeface used in other characters. In this way, the item of optical information can be concealed, with the result that it cannot directly be seen which part of the security element is used as authentication feature. For example, a text can be put in the serif typeface "Times Roman" in 18 point with the exception of a single letter, the serif of which is somewhat shorter than stated or which does not have a serif at all.

For this purpose, it is particularly advantageous if the at least one predetermined item of optical information is present in addition to a further optical, visually perceptible item of information of the diffractive security element, in particular in the form of a symbol, logo, image, sign, alphanumeric character or a number.

It is further possible for the at least one predetermined item of optical information to be or comprise a pixel arrangement and/or a line arrangement and/or the relative position of a pixel arrangement and/or a line arrangement with respect to a further optical, visually perceptible item of information of the diffractive security element, in particular in the form of a symbol, logo, image, sign, alphanumeric character or a number.

Also in this way, the item of optical information can be integrated into the design of the security element inconspicuously.

A further possibility for integrating the item of optical information into the security element consists in the at least one predetermined item of optical information being or comprising a deviation of a graphical property, in particular a line thickness, a color value, a tonal value, a lightness, a grid density, a grid alignment or a typeface, between a first partial region and a second partial region of a further optical, visually perceptible item of information of the optically variable security element, in particular in the form of a symbol, logo, image, sign, alphanumeric character or a number.

Also in this way, the item of information can be concealed in the security element and thus be difficult for forgers to recognize. In particular, such a deviation can be small and localized, with the result that a forger obtains the impression that it is a manufacturing error of the security element, which he would optionally have to "correct" in the forgery. The forgery then, of course, no longer has the predetermined item of optical information and is easy to recognize as such.

For the same purpose, it is also possible for the at least one predetermined item of optical information to be or comprise a deviation from a symmetry between a first partial region and a second partial region of a further optical, visually perceptible item of information of the diffractive security element, in particular in the form of a symbol, logo, image, sign, alphanumeric character or a number.

Of course, all named possibilities for representing the predetermined item of optical information can also be combined with each other.

Alternatively or in addition, it can also be advantageous if the at least one predetermined item of optical information is or comprises an item of information which is visually non-recognizable, or which is visually recognizable only with difficulty, and which can be detected automatically using the sensor.

By visually non-recognizable is to be meant that the item of information cannot be resolved by the human eye at a customary observation distance of approximately 30 cm, preferably from 10 to 50 cm, and at a customary illumination level of 1000 lx, preferably from 10 lx to 100000 lx.

In particular, visually recognizable and visually non-recognizable items of optical information can also be combined in order to thus obtain a security element which is particularly secure against forgery. In addition to the above-described recognition of the visually recognizable item of optical information, further authentication steps can then be carried out using the visually non-recognizable item of optical information. The visually recognizable items of optical information can be checked with the unaided human eye, in particular if the corresponding user is proficient, or trained.

It is expedient if the at least one predetermined item of optical information is formed by a variation of at least one relief parameter of a relief structure of the security element between at least one first zone and at least one second zone of the security element, wherein the relief structure provided in the first and/or second zone is in particular a diffractive structure, a linear or crossed sinusoidal grating structure or binary grating structure, a subwavelength grating or a zero-order diffraction structure, a blazed grating, a macrostructure, in particular a lens structure or microprism structure having a refractive action, a mirror surface, a mat structure, in particular an anisotropic or isotropic mat structure. The relief structure can preferably also have a combination, in particular a superimposition of a macrostructure with a microstructure.

By means of the named structures, many different optical effects can be generated which are particularly difficult to copy and at the same time contribute to providing a visually attractive design of the security element. Slight variations in the structure parameters of these structures can be easily introduced such that they remain below the perception threshold of the human eye but can be detected by means of a sensor. In this way, an item of optical information can be integrated into the security element without impairing the visually perceptible design.

It is advantageous if a lateral dimension of the at least one first and/or of the at least one second zone is less than 600 µm, preferably less than 300 µm, further preferably less than 150 µm.

Through this, it is ensured in the simplest way that the different zones cannot be resolved with the human eye and appear as a homogeneous structure. In particular, if the sensor of the hand-held device has a particularly high optical resolution, it can be advantageous for this.

It is advantageous if the at least one first zone is formed in the form of a symbol, logo, image, sign, alphanumeric character or a number and the at least one second zone forms a background for the at least one first zone.

Visually non-recognizable objects which can be automatically recognized with the same methods as were explained above with reference to the visually recognizable item of optical information can thereby be integrated into the design. Additional detection algorithms are thus not necessary, which makes the implementation of the required programs particularly simple and additionally saves storage space on the device used for authentication.

The first and second zones are preferably gridded in each other at a predetermined grid period.

The grid period is preferably selected such that it cannot be resolved with the human eye. Preferred grid periods are 10 µm to 300 µm. Zones which are gridded in each other then appear to the observer as a homogeneous surface; the zones can only be differentiated by the sensor and can thus be used to authenticate the security element.

The at least one grating parameter is preferably a spatial frequency, an azimuth angle, a relief depth, a relief shape, a phase of the relief structure, a period of an azimuthal variation, a relief depth variation and/or a spatial frequency variation of a one- or two-dimensional grating, an average roughness of a mat structure and/or the preferred direction of an anisotropic mat structure.

Furthermore, it is expedient if the relief structure of the security element is a grating, in particular with grating lines which are curved circularly, parabolically or in the form of wavy lines, with a periodic azimuthal variation, wherein in at least one of the partial regions the period of the azimuthal variation and/or the grid width of the one- or two-dimensional grid is less than 300 µm. For example, azimuthal variations define the range of the observation or illumination conditions under which the OVD appears light or dark, if the OVD is tilted and/or rotated.

Because of the small period, such gratings appear as homogeneous surfaces to the unaided human eye. However, they can be resolved using the sensor, with the result that the at least one predetermined item of optical information can also be encoded here at the level of the grating parameters.

The periodic azimuthal variation preferably covers a range of +/−30° about an average azimuth angle.

It is advantageous if the spatial frequency of the grating is between 3000 lines/mm and 500 lines/mm and in particular is between 1800 lines/mm and 300 lines/mm, particularly preferably is between 1400 lines/mm and 700 lines/mm.

The phase of the periodic azimuthal variation is preferably shifted by 180° between the first and second partial region.

This phase shift, in turn, cannot be recognized by the human eye, but can be resolved by means of the sensor and thus be used in order to integrate the at least one predetermined item of optical information into the design of the security element.

It is further advantageous if the relief structure of the security element is an asymmetrical relief structure and has an azimuth angle in the first partial region which is different from an azimuth angle of the second partial region by 180°.

Such a variation of the grating can also not be recognized with the naked eye but can be resolved by means of the sensor. Ideally this is an asymmetrical grating which has an azimuth angle of 0° with a strong +1 order diffraction in one of the partial regions and an azimuth angle of 180° with a weak −1 order diffraction in the other partial region. If the sensor is located approximately perpendicularly above the OVD, i.e. if its optical axis is approximately parallel to the surface normals of the OVD and the illumination is approximately lateral, i.e. inclined relative to the surface normals, then one partial region (azimuth angle of 0° with a strong +1 order diffraction) is light and the other partial region (azimuth angle of 180° with a weak −1 order diffraction) is dark.

The relief structure preferably has a spatial frequency in the first partial region which differs from the spatial frequency of the second partial region by at least 100 lines/mm.

It is further advantageous if the at least one predetermined item of optical information is generated during the capture of the image sequence through a Moiré effect between a periodic grid of the security element and a periodic grid of the sensor.

In other words, the at least one predetermined item of information only arises in the interaction between a periodic structure of the security element and a periodic structure of the sensor, for example a periodically arranged CCD array. Such a security element is specific to a certain sensor type or at least one specific sensor resolution.

Furthermore, it is expedient if the at least one predetermined item of optical information is generated by a diffractive effect in a wavelength range outside the visible spectrum, in particular in the infrared range.

Such a generated item of information does not have to lie below the resolution limit of the human eye, but can also be macroscopic. In particular, the predetermined item of optical information of a further, visually perceptible item of information can be superimposed without impairing the design of the security element.

Preferably, the diffractive effect is generated by a zero-order diffractive structure, in particular a sinusoidal grating or binary grating with a transparent layer made from a highly refractive material, in particular made from ZnS. In this connection, "highly refractive" means that the real part of the complex refractive index is to be comparatively high, in particular between 1.5 and 2.5. Such diffractive effects with highly refractive materials such as ZnS or $TiO_2$ are often used in ID document protection applications, where large surface-area transparent film systems with diffractive visual effects protect personalized data from manipulation or forgery (ID cards, passports, driving licenses, etc.).

Such structures have sufficient diffraction effects in the infrared range, with the result that the desired effect can be generated simply. In addition to zinc sulfide, other highly refractive materials (HRI=high refractive index, HRI materials), such as for example niobium pentoxide, titanium dioxide or the like, can also be used.

The zero-order diffractive structure preferably has a grating depth of from 50 nm to 500 nm, in particular 200 nm, and/or a spatial frequency of from 500 lines/mm to 3000 lines/mm, in particular of from 1100 lines/mm to 2500 lines/mm.

The layer made from a highly refractive material preferably has a thickness of from 30 nm to 200 nm, in particular 100 nm, and/or has a refractive index (real part) of at least 1.7, preferably of at least 1.9, further preferably of at least 2.1 for the visible spectral range.

An optical effect generated by the relief structure preferably has, at least in regions, a parallax in two spatial directions which are orthogonal to each other.

This can be used in order to indicate one or more preferred observation directions of the security element, which can also be used in the capture of the image sequence. For example, the optical effect can be a cross or a dot which appears to move in two spatial directions when the security element is tilted. The preferred direction can then be indicated in that when the security element is correctly aligned, the cross or the dot appears centered in a surrounding frame. This optical effect is preferably diffractive (e.g. by means of diffractive crossed grating and/or a mat structure) and serves as an optical reference for the preferred direction.

Preferably, to check whether the at least one predetermined item of optical information is present, a filter, in particular a grid filter and/or a color filter is applied to the at least one individual image of the image sequence.

In this way, the at least one predetermined item of optical information can be extracted from the individual image and verified in a simple manner. The use of such a filter involves no large computational outlay and can therefore also be carried out on hand-held devices with low computational power.

It is further expedient if the at least one predetermined item of optical information forms a code, in particular a diffractive barcode.

Complex items of information which make the authentication particularly secure can thereby also be integrated into the security element. When suitable techniques are used to produce the security element, for example when computer-generated holograms are used, items of individualization information, such as for example serial numbers, barcodes or the like, can thus also be introduced into the security element. For example, the items of individualization information can be recognizable as an optically apparently floating effect when the flash of the hand-held device is activated. The optically floating effect should not, however, be visible in diffuse illumination and can be related to the rest of the motif of the OVD in its meaning and/or position, which increases the security against forgery.

It is further preferred if it is checked whether at least one further item of optical information is present in at least one individual image of the image sequence. For example, the at least one further item of optical information can be an item of individualization information, in particular a random, pseudorandom and/or algorithmically generated item of individualization information.

Each individual object provided with such a security feature can thereby be authenticated individually. For example, the item of individualization information can be linked to a serial number, which can be queried in a database during the identification and authentication, in order thus to provide additional items of information and to improve the security of the authentication.

It is expedient if the item of individualization information is formed by a distance of at least one image element of the at least one item of optical information from at least one image element of the at least one further item of optical information.

Thus, the further item of optical information can, for example, be integrated seamlessly into the at least one item of optical information, with the result that it cannot, or can only laboriously, be recognized with the naked eye.

It is further expedient if the item of individualization information is formed by a barcode, in particular a diffractive barcode.

This diffractive barcode can contain a general, fixed item of information, or an item of information which is implemented identically in a certain number of security elements, for example a batch number or a product reference number. The item of information can, however, also be different in each individual security element and thus be unique, for example contain an item of information which is individualized or item-specific, i.e. which does not recur. This unique item of information can be calculated by an algorithm, be pseudorandom or random, or be pseudorandomly or randomly generated.

For example, the predetermined item of optical information can have a single barcode as a 1D barcode or 2D barcode, or a group of at least two or more such barcodes, which together produce an item of information which occurs several times as described above or which is unique, or the items of information of the individual barcodes can also complement each other. The individual barcodes can be arranged next to each other, in particular neighboring or overlapping completely or only in regions.

For example, the barcodes can in each case be formed from a structured and thus encoded reflective layer, in particular a metal layer which is removed in regions, or by a surface structure layer which represents a diffractive code with diffractive and/or non-diffractive relief structures. One of the information levels can also have a coding which is not optically variable, for example in the form of a printed color coding, e.g. a QR code. The printed color coding can, however, also have optically variable and/or optically active components, for example pigments which display effects dependent on the viewing angle and/or on the irradiated light spectrum, e.g. are phosphorescent or luminescent.

In a preferred embodiment, a diffractive barcode as firmly predetermined barcode can be changed by means of subsequent modification such that the barcode contains an individual item of information after the modification. For this, for example, the reflective layer of the diffractive barcode can be locally removed or modified, for example by laser ablation, such that the optically variable diffractive effect is likewise destroyed or modified in the region of the removed or modified reflective layer.

Another possibility is localized overprinting and thus localized covering and thus destruction of the optically variable diffractive effect of the diffractive barcode.

Depending on the arrangement of the individual levels of information, the individual barcodes can be read individually or together, in particular at a common viewing angle or illumination angle or also at different viewing angles or illumination angles. The levels of information can also be combined with non-optical, but in particular electrically or electronically readable levels of information, for example a magnetic layer with inscribed magnetic coding and/or a memory chip with inscribed electronic memory coding.

In general, the at least one further item of optical information can is superimposed on the at least one predetermined item of optical information. The further item of optical information can be directly integrated into the at least one predetermined item of optical information, or, for example, be formed by a further, superimposed layer. Alternatively, it is also possible to separate the at least one further item of optical information from the at least one item of optical information, for example by a non-overlapping neighboring arrangement.

Furthermore, it is expedient if the at least one further item of optical information comprises one or more structures from the following groups:
 relief structures, in particular a diffractive structure, a zero-order diffraction structure, a blazed grating, a macrostructure, in particular a lens structure or microprism structure, a mirror surface, a mat structure, in particular an anisotropic or isotropic mat structure,
 printed structures, in particular comprising colored, optically active and/or optically variable dyes and/or pigments
 magnetic structures,
 partially metalized layers and/or partial HRI layers.

The at least one predetermined item of optical information is preferably a portrait which is recognized in step b) by means of a biometric algorithm.

Biometric features are particularly complex, with the result that a security element which is particularly secure against forgery is obtained. At the same time, the reliable authentication using known biometric algorithms is possible without problems, even in the framework of the computing capacity of a hand-held device.

Before and/or during the capture of the image sequence in step a), instructions are preferably displayed to a user of the hand-held device on a display of the hand-held device about the relative position with respect to the security element and/or the distance from the security element at which the hand-held device is to be held and/or moved during the capture of the image sequence. These instructions can be based on measurement data of the position sensor and/or motion sensor of the hand-held device or be independent thereof.

It can thus be ensured that even unpracticed users can capture an image sequence which is suitable for reliable authentication of the security element. If the capture of an image sequence does not result in any suitable individual images, additional items of information can also be displayed to the user which notifies him, for example, of an error in the capture of the image sequence and educates him about how this can be avoided. Further additional specific items of information can also be displayed to the user, using which features he can recognize forgeries, or items of information can be displayed about where genuine security elements/objects are highly likely to be found and where forgeries are highly likely to be found.

Furthermore, it is expedient if, in step a), the individual images of the image sequence are captured at a resolution of at least 0.5 line pairs/mm, preferably of at least 5 line pairs/mm, further preferably of at least 20 line pairs/mm.

Such a resolution is sufficient in order to make possible a reliable recognition of the at least one predetermined item of optical information and can be achieved by usual hand-held devices such as smartphones, tablets or PDAs without problems.

Preferably, before the capture of the individual images in step a), an illumination level is measured and if the illumination level is less than 800 lx, a light source of the hand-held device is activated. This can take place automatically by the hand-held device or manually by the user.

It is thus ensured that the security element is sufficiently illuminated in order to make a reliable authentication possible. An illumination level of 800 lx corresponds approximately to an office with normal lighting.

Furthermore, it is advantageous if, when at least one predetermined item of optical information is present, an authentication confirmation is output on an output facility, in particular a display.

It is thus clearly communicated to the user whether the investigated security element is authentic or not. Building on this, further items of information can then be conveyed to the user.

Preferably, step b) is carried out by means of a software program executed on a computing device of the hand-held device.

In this case, the authentication can take place directly in situ, without the data of the image sequence needing to be transferred from the hand-held device to a further device. This makes it possible to carry out the method in a particularly flexible manner.

Furthermore, it is advantageous if the software program and/or a database allocated to the software program is updated at predetermined intervals, in particular before each time the method is carried out, via a telecommunication connection, in particular an Internet connection.

Items of information about new or changed security elements can thereby be conveyed to the software program and the at least one predetermined item of optical information, or the algorithms used for the checking thereof, can be adapted accordingly. In addition, items of information about new known forgeries and the specific characteristics thereof can thus be conveyed to the software and/or to the user, with the result that the recognition of these is made easier.

It is also possible to carry out step b) by means of a software program executed on a computing device different from the hand-held device, to which computing device the image sequence captured in step a) is conveyed via a telecommunication connection, in particular an Internet connection.

Such a computing device is preferably a centralized server which can take over the evaluation of the image sequences of a multitude of hand-held devices. The server comprises at least a processor, volatile and non-volatile data storage devices, as well as suitable input and output devices. In this case, the hand-held device acts as a client in a client-server structure.

As a considerably larger computation capacity is available on such a server than on a hand-held device, more complex image processing algorithms and pattern recognition algorithms can also thus be performed. In addition, more storage space is also available on such a server, with the result that larger databases with features of authentic security elements and known forgeries can be provided.

Advantageously, if the at least one item of optical information and/or the diffractive structure is not present in step b), a notification which comprises an item of position and/or time information is to the computing device, which is different from the hand-held device.

In other words, forgeries of security elements which are discovered are conveyed to the computing device, which is preferably a central server. From the items of position and time information which are associated with the discovered forgeries, conclusions can then be drawn as appropriate about the source of the forgeries, which makes it easier to discover the forgers, and can additionally be conveyed to other users as items of warning information.

Preferably, in a further step c), it is checked whether at least one further predetermined item of optical information which is present in a known forgery of the optically variable security element and is not present in a genuine optically variable security element is present in at least one individual image of the image sequence.

It is further expedient if, when the at least one predetermined item of optical information is not present and the at least one further predetermined item of optical information is not present, a notification which comprises an item of position and/or time information, as well as at least one individual image of the image sequence, is conveyed to the computing device, which is different from the hand-held device.

If a checked security element thus turns out not to be authentic and at the same time cannot be identified as a known forgery, a new forgery is present. The captured items of image information of the hitherto unknown forged security element are then conveyed to the server, with the result that the new forgery can be investigated. Characteristic features of the new forgery can then be conveyed back to the hand-held devices again as a further predetermined item of optical information, with the result that the new forgery can be recognized particularly reliably. This can be supported by a piece of "learning" software with corresponding training algorithms. The newly recognized forgeries are supplied to a database, using which the software is trained recursively and thereby newly occurring forgeries can in turn be better recognized thereafter.

Suitable for carrying out such a method is a device, in particular a hand-held device with a sensor for capturing an image sequence with at least one individual image of a security element and a control facility which is designed such that it performs the following steps:
 a) capturing an image sequence with at least one individual image of the security element by means of the sensor;
 b) checking whether at least one predetermined item of optical information is present in at least one individual image of the image sequence.

The invention further relates to a computer program product which is designed such that, during execution on a computing device, it carries out step b) according to one of claims 1 to 54.

The invention further relates to a server with a computing device, which is designed such that it performs step b) according to one of claims 1 to 54.

The invention also relates to a security document, in particular banknote, value paper, identification document, passport, driving license or credit card, with an optically variable security element of the type described, as well as a product or product packaging with an optically variable security element of the type described.

BRIEF DESCRIPTION OF THE DRAWINGS

Embodiment examples of the invention are explained below by way of example with reference to the figures. There are shown in:

FIG. 28 A-D: A schematic representation of a combination of a barcode and a strip-shaped diffractive individualization code.

DETAILED DESCRIPTION OF THE INVENTION

Figure 1:
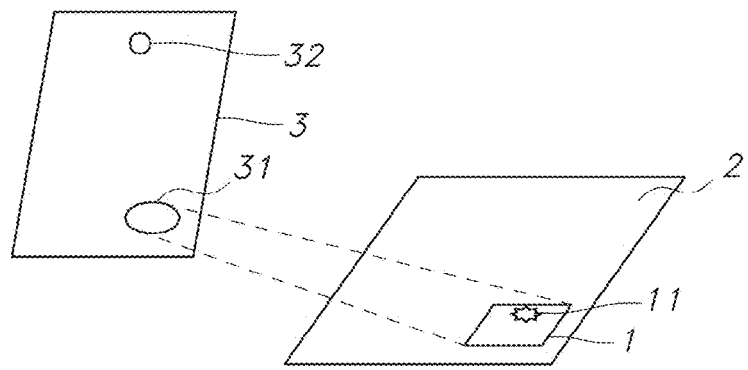
FIG. 1: A schematic representation of a security element and hand-held device during the authentication of the security element.

A security element 1 for protecting a document 2 against forgery has items of optically detectable information, which preferably comprise at least one visually perceptible motif 11, as shown by FIG. 1. The motif 11 can be a symbol, logo, image, sign, alphanumeric character or a number. Instead of a document, a commercial product and the label and/or packaging thereof or a ticket or voucher can be involved.

Preferably, the visually perceptible motif is at least partially generated by a grating structure of the security element 1. By a grating structure is to be meant a diffractive structure, a zero-order diffraction structure, a blazed grating, a linear or crossed sinusoidal grating structure or binary grating structure, a macrostructure, in particular a lens structure or microprism structure having a refractive action, a mirror surface, a mat structure, in particular an anisotropic or isotropic mat structure or combinations thereof. Such grating structures are optically variable, and thus display different optical effects at a different illumination or observation angle. The motif 11 can furthermore also be partially generated by structures which are not optically variable, for example layers applied by means of printing, in particular color layers. Another example of a structure which is not optically variable is the background on which the security element 1 is applied, for example made from materials such as paper or plastic, which do not have any optically variable properties.

Figure 2:
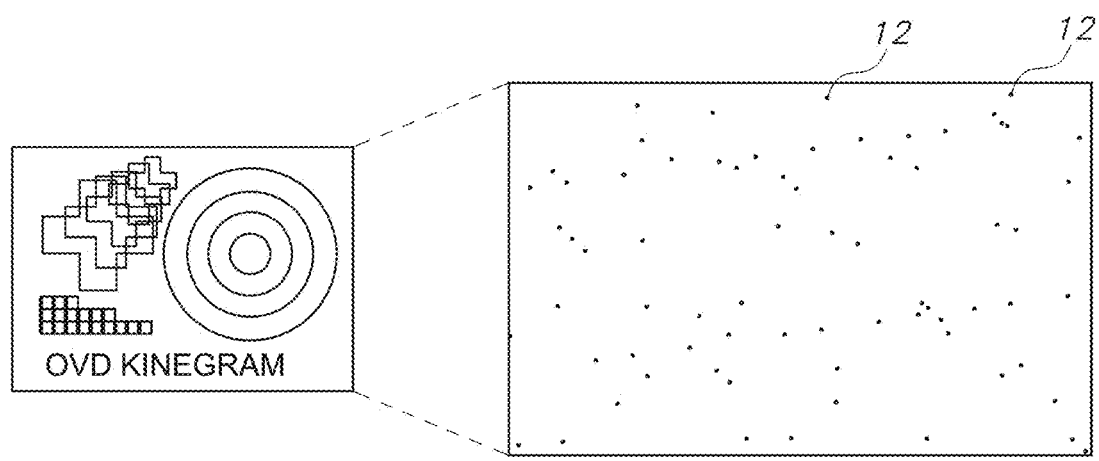
FIG. 2: A schematic representation of a security element with a visually recognizable authentication feature.

In order to guarantee a particularly good security against forgery, it is possible to introduce items of information into the grating structure or the motif 11 which cannot be easily recognized as such. An example of this is shown by FIG. 2. The visually recognizable motif 11 here is superimposed with an arrangement of pixels 12 distributed according to a predetermined pattern. The superimposition can be additive, i.e. the motif structure 11 and the pattern structure 12 complement each other, or the superimposition is an XOR operation, i.e. the pattern structure 12 replaces the motif structure 11 at the positions where both structures overlap. The arrangement of the pixels 12 and their relative position with respect to the motif 11 forms a further item of information which can be used to authenticate the security element 1.

Figure 3:
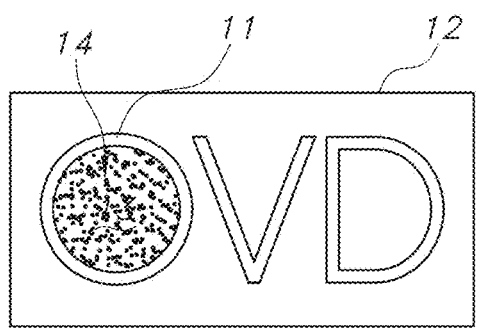
FIG. 3: A schematic representation of a security element with a visually non-recognizable optically variable authentication feature.
Figure 4:
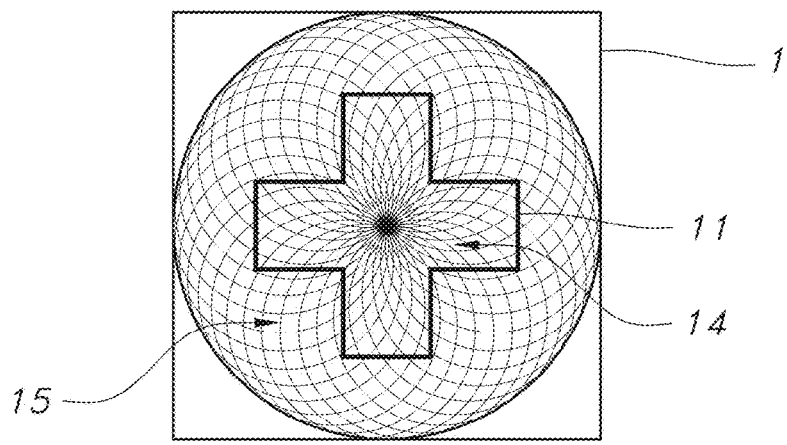
FIG. 4: A schematic representation of an alternative security element with a visually non-recognizable optically variable authentication feature.

A further possibility for integrating a further item of information into the motif 11 is shown by FIG. 3. Here, a free surface 13 in the motif 11 is filled with a diffractive structure 14, which forms the further item of information. Such diffractive structures 14 can also be integrated into Guilloche line arrangements 15, as shown by FIG. 4.

Figure 5:
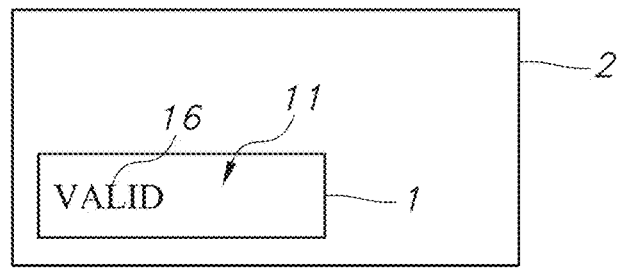
FIG. 5: A schematic representation of an alternative security element with a visually recognizable authentication feature.
Figure 6:
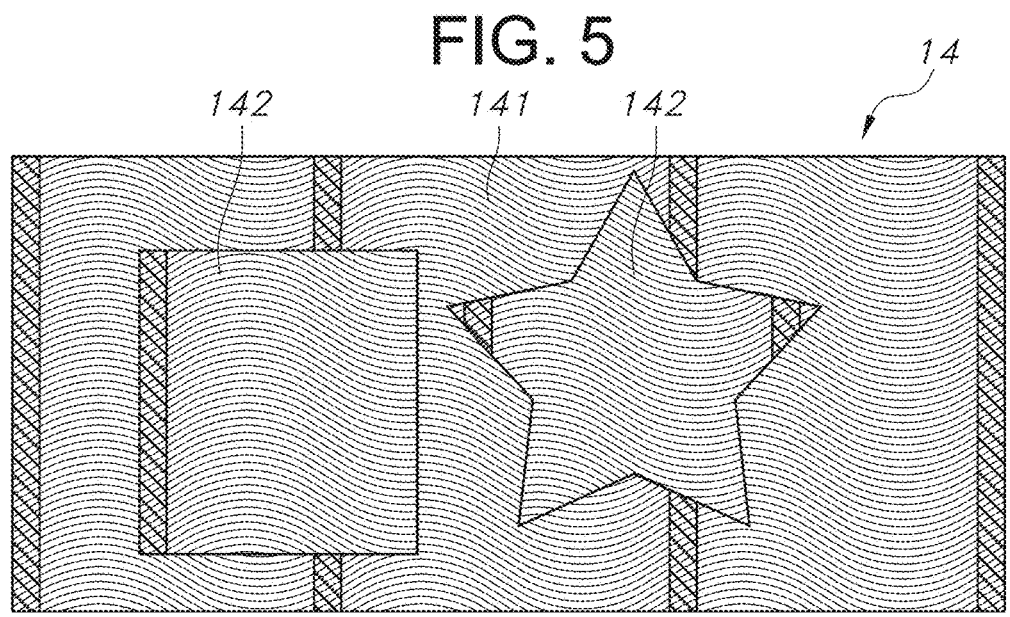
FIG. 6: A detailed view of the grating structure of a security element with grating curved in the form of wavy lines.

Visually recognizable items of information can also be integrated into the motif 11, as represented in FIG. 5. Here, the motif 11 is lettering in which a letter 16 is put in a different typeface and thereby differs from the other letters of the lettering.

It is particularly advantageous if the security element 1 is authenticated automatically. For this, an image sequence of the security element 1 is captured by an image sensor 31 of a device 3. The device 3 is preferably a smartphone, a tablet, a PDA or another hand-held device with an image sensor.

The image sequence comprises at least two individual images. In poor light conditions, in particular at an illumination level of less than 800 lx, thus an illumination which is darker than average room lighting, an illuminating device 32, i.e. a lamp or a flash, of the device 3 can also be switched on. Because of the optical variability of the optical appearance of OVDs, it is expedient if the specific properties of the illuminating device 32 of the device 3 used are known, in particular the spectrum of the emitted light and the relative position of the illuminating device 32 with respect to the image sensor 31, from which the direction of the light irradiated onto the OVD by the illuminating device 32 can be reliably ascertained. Through this, at least this extent of the influence on the optical effect can be determined comparatively precisely.

The device 3 also preferably has, in addition to the image sensor 31, one or more processors and/or input and output modules, an operating system which runs on this hardware platform and further software components running thereon, in particular control programs, through the running of which the functions of the device 3 are realized.

As a rule, the sensor used is a digital electronic sensor, for example a CCD sensor (CCD=charge-coupled device). CCD arrays, thus arrangements of CCDs in which individual CCDs are arranged in a two-dimensional matrix, are preferably used. The individual images generated by such a sensor are then present in the form of a pixel matrix, wherein each pixel corresponds to an individual CCD of the sensor. Preferably, such a sensor has at least a resolution of 0.5 megapixels, particularly preferably of more than 2 megapixels. The quality of the lens optical system which interacts with the sensor is important for the optical resolution which results from this.

In order to detect the optical variability of the security element 1, the image sequence comprises a multitude of individual images of the security element, in particular more than 2 individual images of the security element. The image sequence can be a plurality of discretely created individual images which have no temporal connection, but it can also be a film, thus consist of individual images which are captured at predefined time intervals, in particular at an acquisition frequency of from 5 to 60 images per second.

Preferably, the observation angle is changed during the capture, thus the device 3 is pivoted relative to the security element, with the result that the item of optical information formed by the grating structure of the security element 1 from the direction of view of the device 3 changes during the capture.

Preferably, it is indicated to the user on a display of the device 3 how he is to move the smartphone relative to the security element 1 in order to obtain an image sequence which can be evaluated optimally. During the capture of the image sequence, the relative position between device 3 and security element 1 can additionally be measured by means of a position sensor of the device 3, with the result that for each individual image the respective observation angle is known.

The evaluation of the image sequence captured in this way can take place directly in the device 3. The images of the image sequence are stored digitally in a memory of the device 3 and processed by means of a processor of the device 3, which executes an appropriate piece of software.

It is first checked whether the motif 11 is present in at least one individual image of the image sequence. The motif 11 can be the entire design of the security element itself or only represent one partial aspect thereof. This ensures that the at least one individual image actually represents the security element to be authenticated. If this is not the case, further investigations can be dispensed with and the user can be notified that the images captured by means of the sensor 31 are unsuitable for the purpose of authentication and must possibly be captured again.

The individual images of the image sequence are then analyzed using the Haar-cascade algorithm. This is based on the evaluation of a multitude of so-called "Haar-like" features in the individual image. These are structures which are related to Haar wavelets, thus square wave trains with a predetermined wavelength. In two dimensions, these are simply neighboring, alternating light and dark rectangular regions in the image. By shifting a rectangular mask over the individual image, the "Haar-like" features present are ascertained. The "Haar-like" features present are then compared with those which are supposed to be present in the motif 11. This can take place via a filter cascade.

The Haar cascade algorithm has the advantage of requiring particularly little computing time and few computer resources. However, it is also possible to use other image recognition algorithms.

To check whether the motif 11 is present, a comparison of the at least one individual image with a previously acquired training data set is carried out. This can take place within the framework of the described Haar-cascade algorithm, but also by means of other algorithms.

The image recognition is thus based on a form of computational learning. The algorithm is not provided with any specific parameters, using which a classification of the image content is carried out, but rather the algorithm learns these parameters using the training data set.

In order to create the training data set, a plurality of images are captured, wherein a first subset of the images in each case have the motif 11 and a second subset of the images in each case do not have the motif 11, and wherein all respective image coordinates of the features to be recognized of the motif 11 are allocated to each image of the first subset.

Using the first and second subsets as well as the allocated image coordinates, a training of the image recognition algorithm is then carried out. Through this, the algorithm learns to classify the images correctly and, where appropriate, to ignore disruptive factors intentionally introduced into the training data set, such as for example reflections in the images, random shading or the like.

If the presence of the motif 11 can be confirmed, the contour of the motif 11 is then ascertained from at least one individual image of the image sequence. Compared with the above-described simple image recognition, which only supplies a yes/no classification or a probability for whether the motif 11 is present in the individual image, additional items of information are thus provided. In particular, the presence or absence of detailed features of the motif 11 can be checked using the ascertained contour. This supplies further items of information which can contribute to the authentication of the security element.

For the authentication of the security element 1, it is thus possible to use only one detail of the entire design. This makes it possible to also conceal visually recognizable security features, as it were, in the design of the security element 1.

In order to determine the contour of the motif 11, an edge detection algorithm, such as the Canny algorithm, can be used.

To apply the Canny algorithm to color images, these must first be converted into shades of gray. In grayscale images edges are characterized by strong fluctuations in lightness between neighboring pixels and can thus be described as discontinuities in the grayscale value function of the image.

As such discontinuities can also be caused by image noise, it is expedient if during the execution of the edge detection algorithm a noise filtering is carried out, in particular by means of a Gaussian filter with a preferred kernel size of from 3 to 7.

By kernel is meant here a convolution matrix which is applied to the item of image information. The convolution matrix of the Gaussian filter corresponds to normal distribution and acts as a low-pass filter. The grayscale value of a filtered pixel thus corresponds to the average of the grayscale values of the surrounding pixels weighted with the normal distribution up to a maximum distance defined by the kernel size. Smaller structures resulting from noises are lost, while the main structures of the motif 11 are preserved.

Preferably, during the execution of the edge detection algorithm, an edge detection is carried out by applying a Sobel operator in at least one preferred direction of the at least one individual image, preferably in two orthogonal preferred directions of the at least one individual image.

The Sobel operator is likewise a convolution operator, which acts as a discrete differentiator. By convolving the image with the Sobel operator, the partial derivations of the grayscale value function in the two orthogonal preferred directions are obtained. The edge direction and edge strength can then be determined from this.

After the differentiation of the grayscale value data, an edge filtering is then carried out. This can take place for example by means of a so-called non-maximum suppression, which ensures that only the maxima along one edge are preserved, with the result that an edge perpendicular to its direction of extension is not wider than one pixel.

After the filtering, a threshold-based ascertaining of the image coordinates of the contour of the motif 11 can then be carried out. It is thus ascertained from what edge strength a pixel is to be classed with an edge.

For this, for example, a hysteresis-based method can be used. Two threshold values $T_1$ and $T_2$ are established for this, wherein $T_2$ is greater than $T_1$. A pixel with an edge strength greater than $T_2$ is regarded as a constituent of an edge. All pixels with an edge strength greater than $T_1$ connected with this pixel are likewise assigned to this edge.

The image coordinates of all pixels belonging to an edge of the motif 11 in the investigated individual image are thus obtained. These can be analyzed further, for example in order to recognize simple geometric shapes.

The individual image can then, based on the ascertained image coordinates of the motif 11, be divided into at least two partial regions and for each partial region the ascertained image coordinates of the contour are compared with corresponding target coordinates and, from this, in particular the presence and/or the size and/or the relative position of predetermined contours is ascertained. The partial regions are selected in consideration of the target position of the features of the motif 11 which are used for the authentication.

In order to authenticate a security element investigated in this way as genuine, there does not necessarily need to be absolute matching; it is also possible to specify tolerance ranges for admissible deviations. Deviations need not necessarily indicate a forgery, as optical artifacts, perspective distortions, wear or dirtying during use or similar effects which can occur during the capture of the individual image can also impair the matching with the original.

For example, a partial region of the individual image, which is positioned in a predetermined location relative to the contour of the motif 11, and which comprises at least one pixel 12 and/or at least one pixel group of the individual image, is selected and at least one property of the at least one pixel 12 and/or of the at least one pixel group of the at least one selected partial region is compared with a corresponding target value. The presence of the pixel pattern shown in FIG. 2 can thereby be checked, for example.

Deviations in the typography, as represented in FIG. 5, can also be checked using the ascertained contour data.

In addition, it can be checked whether the security element comprises an optically variable structure. For this, two individual images of the image sequence which have been captured under different observation and/or illumination conditions are compared.

If these individual images differ sufficiently, the presence of an optically variable structure can be assumed. If this is not the case, a static copy is present. It is sufficient to compare corresponding pixels and/or pixel groups of the individual images in each case, for example with respect to their lightness or their color value. In this way, the identity or non-identity of the individual images can be determined without a large outlay on processing.

To check the identity of the individual images, therefore, it is not necessary to recognize any structures at all in the individual images; it is sufficient to observe OVD-specific changes on the basis of the changed observation or illumination angle at pixel level. This is particularly efficient and saves computing time.

Alternatively or in addition to the described recognition of macroscopic features of the motif 11, visually non-recognizable authentication features can also be integrated into the security element 11, for example into the grating structure 14 shown in FIGS. 3 and 4. These can be used for a further authentication of the security element 11, in order to increase the security against forgery.

For example, it is possible to grid regions which differ in at least one grating parameter in each other (interlaced arrangement) such that a homogeneous surface results visually. The differences in the grating structure can, however, be resolved using the sensor 31 of the device 3.

The grid period is selected such that it cannot be resolved with the human eye. Preferred grid periods are 10 µm to 300 µm. The regions can, for example, differ in spatial frequency, azimuth angle, relief depth, relief shape, a phase of the relief structure, a period of an azimuthal variation, a relief depth variation and/or a spatial frequency variation of a one- or two-dimensional grating, an average roughness of a mat structure and/or the preferred direction of an anisotropic mat structure.

An example of such a structure is shown in FIGS. 6 to 9. While customary gratings have straight grating lines with a predetermined spatial frequency and a predetermined azimuth angle, the azimuth angle of the grating 14 in the named figures varies with the spatial position. In this way, gratings 14 which are curved in the form of wavy lines, parabolically or circularly can be generated. The periodicity of this variation lies below the resolution limit of the human eye, in particular below 300 µm, preferably below 150 µm, with the result that the grating 14 appears homogeneous in its entirety and displays the same optical effect over its entire surface area when tilted. Such gratings 14 can be used in order to better define under what observation and illumination conditions an OVD appears light or dark or colored in a specific way.

At the same periodicity and the variation of the azimuth angle, regions 141, 142 of the grating 14 are additionally gridded in each other. This gridding also cannot be resolved by the human eye. The region 141 forms a background for the regions 142 designed as motif.

In the examples shown, the gratings of the regions 141 and 142 differ in that the phase of the azimuthal variation is shifted between the regions 141 and 142 by 180°. While this is not perceptible for the human eye at a customary observation distance of 30 cm, these regions can be resolved by the sensor 31, with the result that the item of information represented by the arrangement and shape of the regions 141, 142 can be used to authenticate the security element 1.

Figure 7:
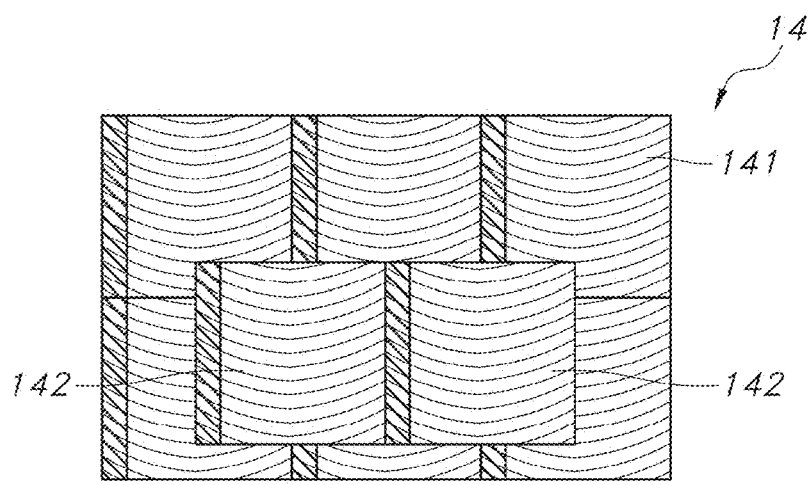
FIG. 7: An alternative detailed view of the grating structure of a security element with grating curved in the form of wavy lines.
Figure 8:
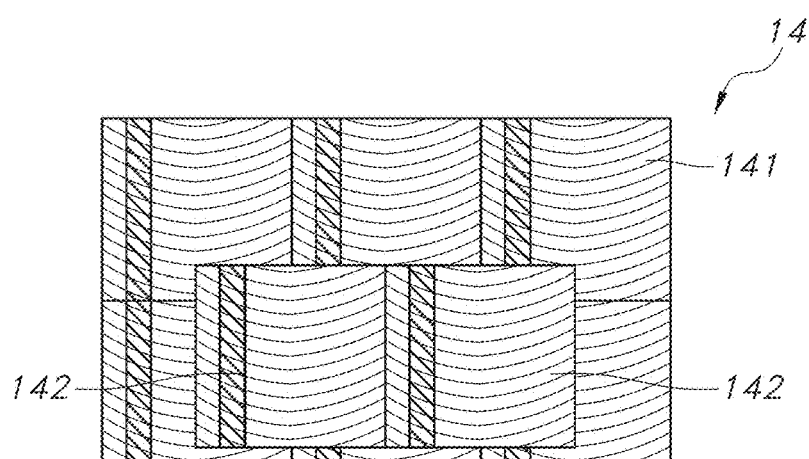
FIG. 8: An alternative detailed view of the grating structure of a security element with grating curved in the form of wavy lines.

FIGS. 7 and 8 show an alternative grating 14 at different observation angles. The areas with a dark background represent appear light in front of a dark background to the sensor 31 at the respective observation angle. It can be recognized that these areas move when the security element 1 is tilted relative to the sensor 31. This effect can also only be perceived using the sensor 31, while the grating 14 appears homogeneous to the naked eye.

In this case, the regions 141, 142 are gridded in each other at a grid period of 100 µm, the spatial frequency of the grating is 667 lines/mm, the period of the azimuthal variation is 80 µm with an azimuthal change of +/−30°.

Figure 9:
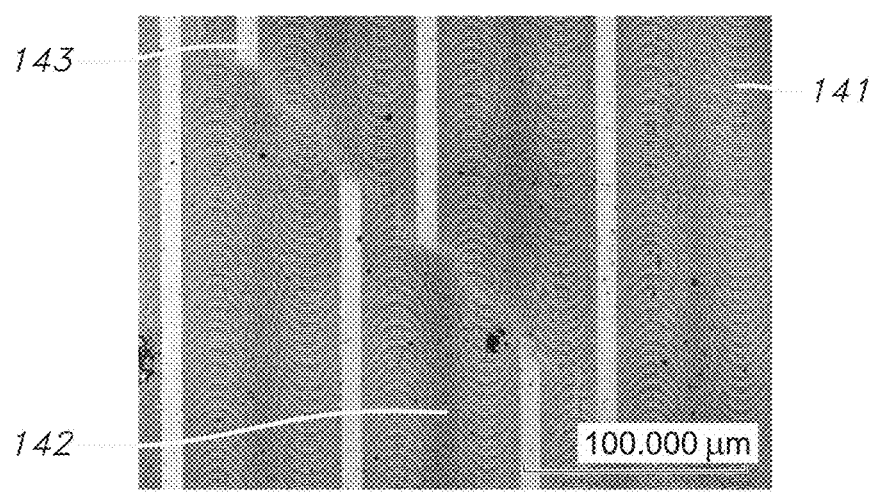
FIG. 9: An electron microscope photograph of a grating according to one of the FIG. 7 or 8.

A specific embodiment of the grating shown in FIGS. 7 and 8 is shown in FIG. 9 in an electron microscope photograph. The diagonal line 143 running through the image represents the boundary between a background region 141 and the motif region 142.

Figure 10:
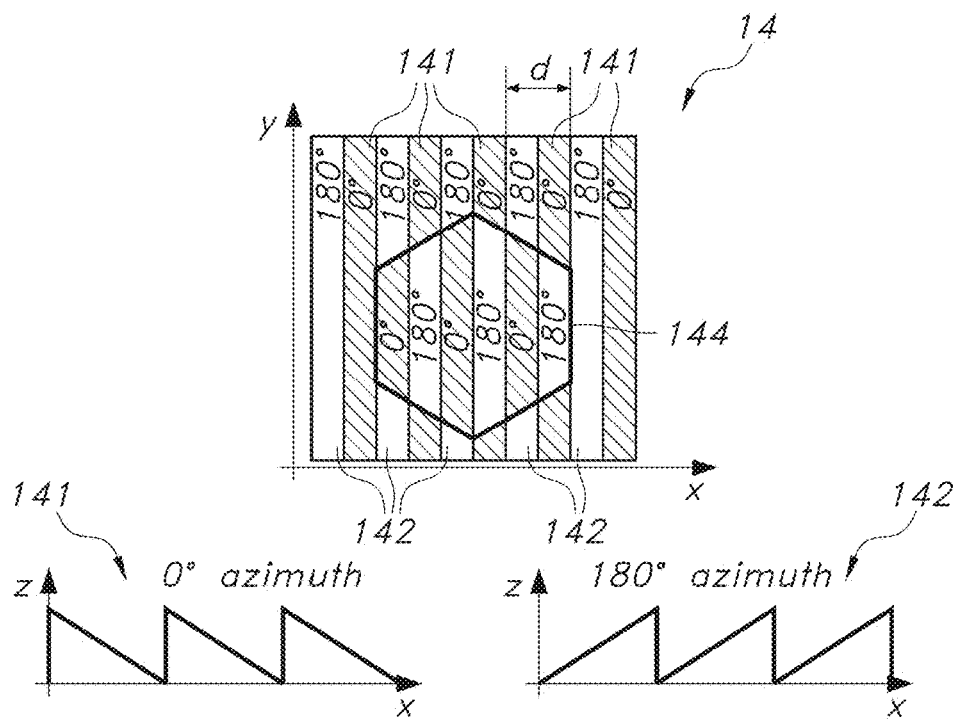
FIG. 10: A detailed view of a security element with zones gridded in each other with different azimuth angles.

As shown by FIG. 10, regions 141, 142 can also be gridded in each other (interlaced arrangement) at, in each case, a constant azimuth angle, which, however, differs between the regions 141 and 142 by 180°. The regions are arranged such that a phase-shifted motif 144 results. An asymmetrical grating, for example a blazed grating, is necessary for this. The grating can be chromatic (blazed grating with a period of approx. 1 µm) or achromatic (blazed grating with a period of more than 5 µm).

In the regions 141, the azimuth angle is 0°, with the result that a strong first-order diffraction becomes visible, while in the regions 142, with an azimuth angle of 180°, a weak −1 order diffraction is visible. The width of the regions, thus the period of the grid, is approximately 100 µm, with the result that the surface in turn appears visually homogeneous. However, by using a grid filter on the image captured with the sensor 31, the motif 144 can be resolved.

Analogously, it also possible to grid the regions 141, 142 which in each case represent anisotropic mat structures with different azimuth orientations or isotropic mat structures with different scatter characteristics. The dimensions of the grid are the same as in FIG. 10. The regions 141, 142 then differ in terms of their grayscale value. The entire structure in turn appears visually homogeneous, but, likewise, by using a grid filter on the image captured with the sensor 31 it can be resolved.

Figure 11:
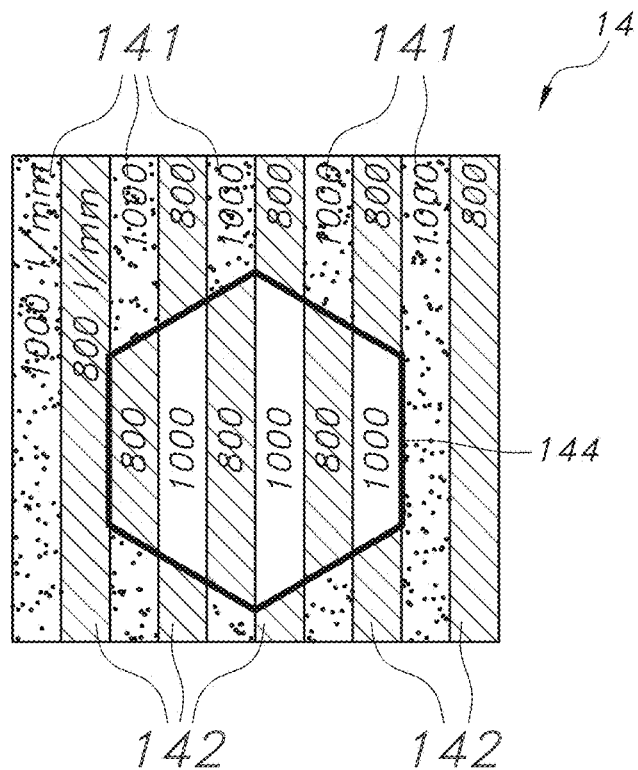
FIG. 11: A detailed view of a security element with zones gridded in each other with different spatial frequencies.

A gridding of the regions 141, 142 with different spatial frequencies is likewise possible, as shown in FIG. 11. The regions 141, 142 then have different colors for a given observation angle; however, the entire surface of the grating 14 appears homogeneous to the human eye. In the example of FIG. 10, the regions 141 have a spatial frequency of 1000 lines/mm and the regions 142 have a spatial frequency of 800 lines/mm; the regions are gridded in each other at a grid period of 300 µm. In turn, the phase-shifted motif 144 is recognizable for the sensor 31.

In order to better avoid the different colors of the regions 141, 142 becoming visible when the security element 1 is tilted, it is expedient if the spatial frequencies of the grating in the regions 141, 142 are closer together. For example, the region 141 can be formed from a sinusoidal grating with a spatial frequency of 900 lines/mm and the region 142 can be formed from a sinusoidal grating with a spatial frequency of 800 lines/mm.

Figure 12:
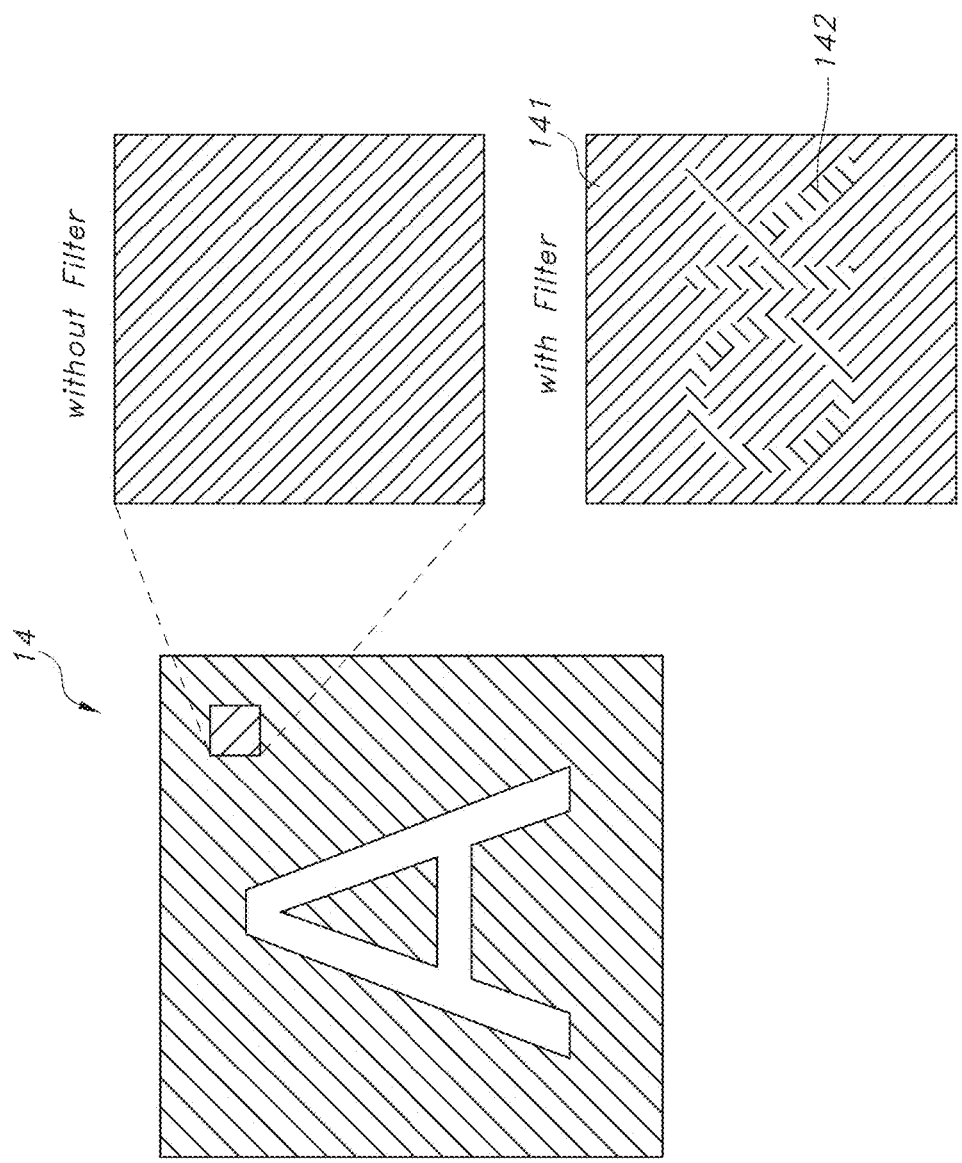
FIG. 12: A schematic representation of an alternative security element with a visually non-recognizable optically variable authentication feature with and without grid filtering of the captured image.

A further option is shown in FIG. 12. Here the regions 141, 142 differ slightly in terms of the grating depth and thus the efficiency, with the result that a metameric color pair results. If, for example, the efficiency of the grating in the regions 141, 142 for red is slightly different, the motif 144 can be made visible by a red filter, as is shown on the far right in the figure. The size of the regions 141 and 142 is preferably chosen to be small enough that the regions are inconspicuous for the human eye, but can still be resolved well using the sensor.

Figure 13:
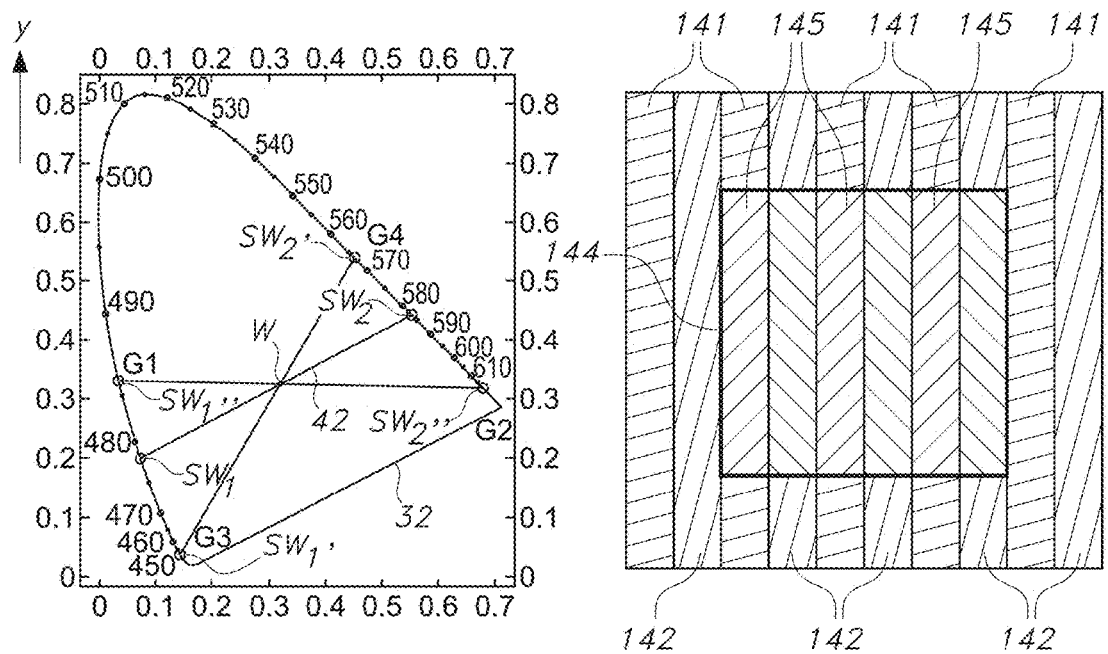
FIG. 13: A schematic representation of an alternative security element with a visually non-recognizable optically variable authentication feature with zones of different colors gridded in each other as well as an associated chromaticity diagram.

As shown by FIG. 13, more than two different regions 141, 142, 145, 146 of the grating 14 can also be used. The regions 141, 142, which form the background for the motif 144, appear in the colors G1 (485 nm) and G2 (620 nm). The regions 145 and 146, which form the motif 144, appear in the colors G3 (450 nm) and G4 (568 nm).

Because of the small period of the gridding of the regions (less than 300 µm), the motif 144 and the background in each case appear homogeneous, as a mixed color from the colors G1+G2 and G3+G4, respectively. As the chromaticity diagram represented on the left shows, the colors can be chosen such that G1+G2 and G3+G4 in each case form the same mixed color. To the naked eye, the entire grating 14 thus appears homogeneous.

However, by color filtering using the device 3, the motif 144 can, in turn, be resolved. This is also possible in the case of illumination with different light sources. For example, the device 3 can compare an individual image which was captured in daylight with an individual image which was captured using flash.

Similar color effects can also be used in order to integrate hidden motifs 144 into a true-color hologram.

Figure 14:
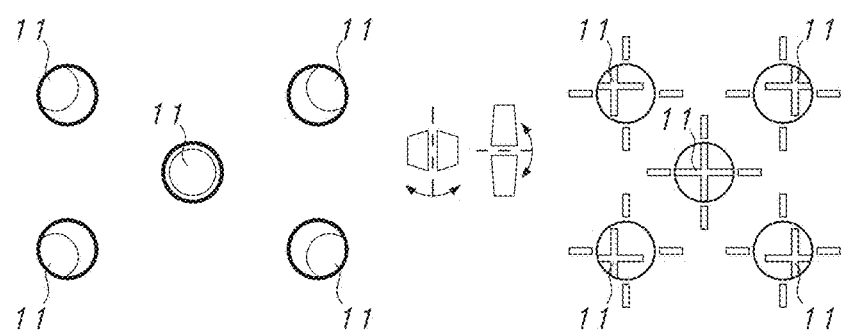
FIG. 14: A schematic representation of an alternative security element with parallax effect along two orthogonal axes.
Figure 15:
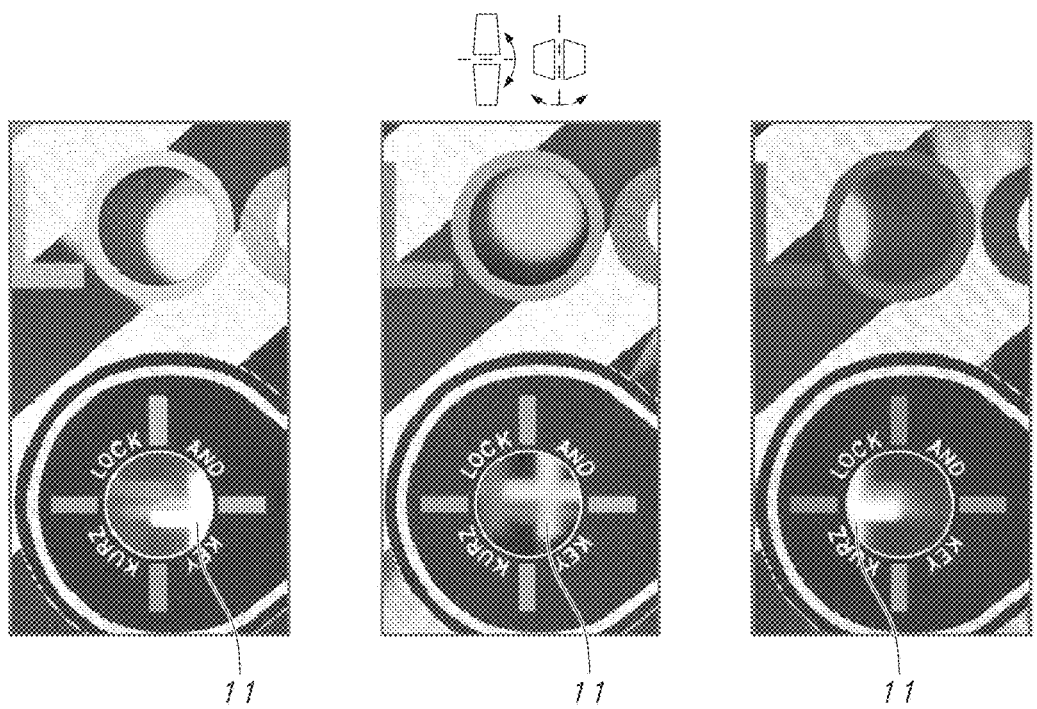
FIG. 15: A schematic representation of a further alternative security element with parallax effect along two orthogonal axes.

As shown by FIGS. 14 and 15, motifs 11 which display a parallax effect in two spatial directions when the security element 1 is tilted can also be introduced into the security element 1. The motif 11 thus appears to move, in dependence on the observation angle, in two directions relative to the surrounding structures. Under typical illumination conditions, in particular simple motifs 11, such as circles or crosses, are suitable for this as more complex motifs easily become indistinct here.

The relative position of the motif 11 to the surrounding structures can now be used in order to reconstruct, from a captured individual image, the relative position the security element 1 had with respect to the sensor 31 when the individual image was captured. In addition to defined diffractive surrounding structures, the relative position with respect to a diffractive background image can also be exploited (ghost image).

Such motifs 11 become more clearly recognizable in the case of illumination with point light sources. When complex motifs are used, these can become almost completely indistinct in diffuse ambient lighting. Here a comparison between an individual image in ambient lighting and an individual image with flash is again possible. The flash can make visible concealed motifs 11 which are only recognizable in point illumination. The known relative position of the flash with respect to the image sensor is also useful.

In general, visually non-recognizable structures which can only be resolved using the sensor 31 can also be integrated into computer-generated holograms. This can be for example a hidden dot or line pattern as in FIG. 2.

Figure 16:
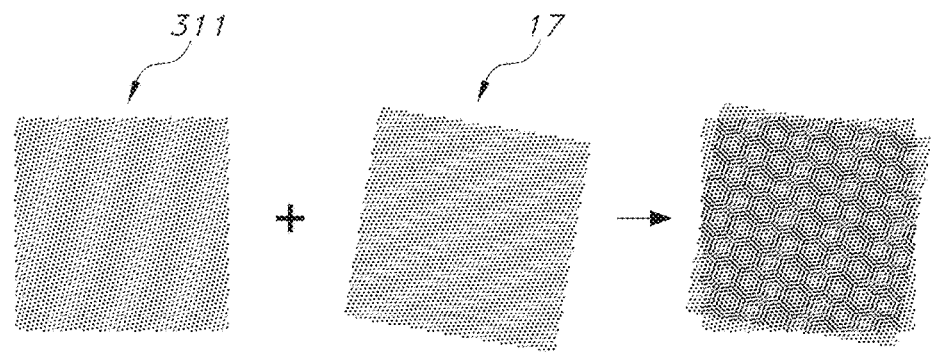
FIG. 16: An illustration of the Moiré effect between a grid structure in a security element and a gridded photosensor.

As shown by FIG. 16, the fact that the sensors 31 of smartphones or the like are customarily designed as CCD arrays can furthermore be exploited. Thus, the sensors 31 have a periodic grid 311 of individual photosensitive elements. If a grid structure 17 with a suitable grid width is applied to the security element 1, a Moiré effect thus results between the two grids 311 and 17 when the image sequence is captured at an appropriate distance.

The individual photosensitive elements of the sensor 31 customarily have a size of from 1.5 to 2 µm and are also spaced far apart from each other. The period of the grid is therefore 3 to 4 µm. The Moiré effect with the grid 17 thus results in dependence on the grid width of the grid 17 and the observation distance. This can likewise be used to authenticate a security element 1.

Figure 17:
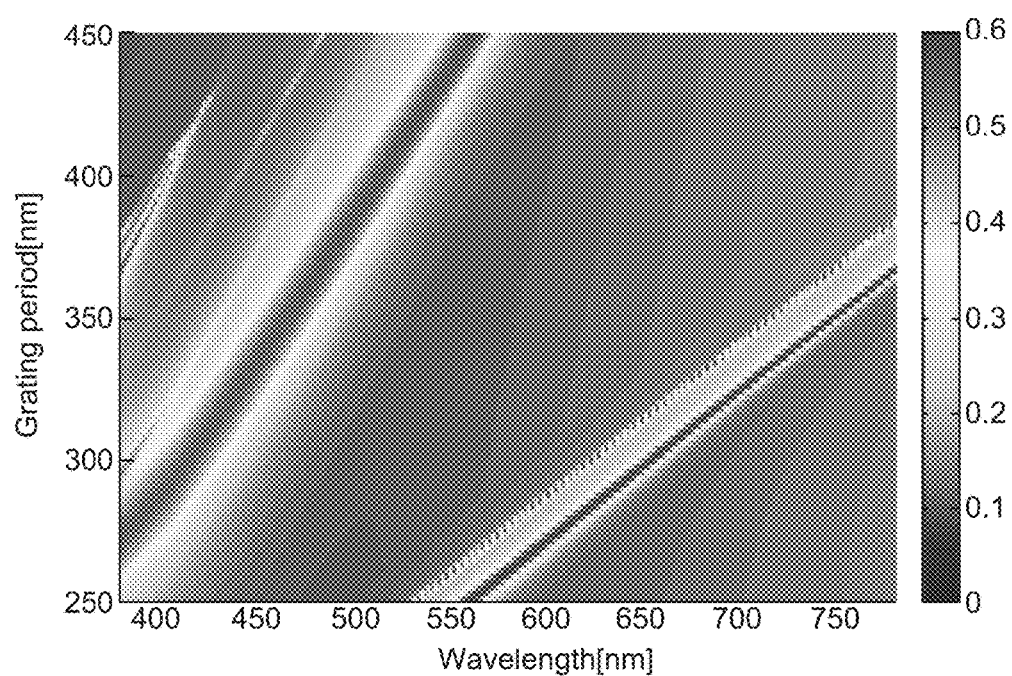
FIG. 17: A diagram to illustrate the diffraction intensity as a function of wavelength and grating period.

The optical effects used to authenticate the security element 1 do not have to lie in the visually perceptible spectrum. FIG. 17 shows the reflection behavior of different zero-order sinusoidal gratings as a function of the grating period and the wavelength. Precisely in the case of zero-order gratings which are provided with a transparent layer made from a highly refractive material, such as for example ZnS, the reflection in the infrared range can also be used. For example, a zero-order grating with a grating period of 350 nm has a reflection peak in the visible spectral range at approx. 470 nm and at the same time a second reflection peak at approx. 760 nm. The reflection peak with the longer wavelength is practically no longer recognizable to the human eye.

Figure 18:
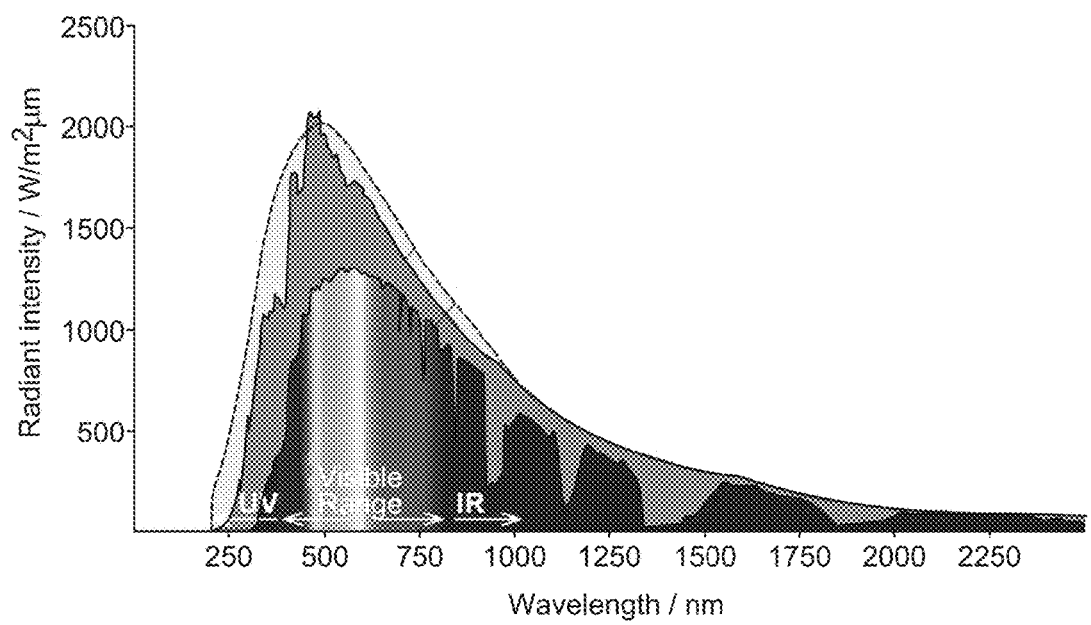
FIG. 18: comparative diagrams of the solar spectrum and of the spectrum of a flash of a smartphone; in this graph, only one curve is shown.
Figure 18:
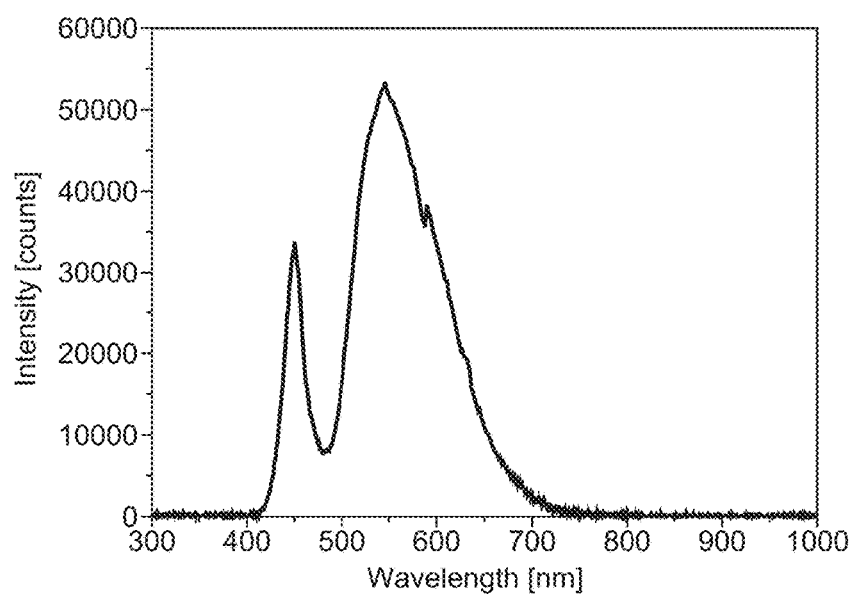

The extent to which the optical effect can be evaluated, however, also depends on the quality of the light used to capture the image sequence. FIG. 18 shows a comparison of the solar spectrum (top) with the spectrum of a typical smartphone flash (bottom). As can be recognized, a sufficient IR intensity is available in the solar spectrum, while the flash barely has any infrared portions. For this type of authentication, it is therefore advisable to use sunlight.

Figure 19:
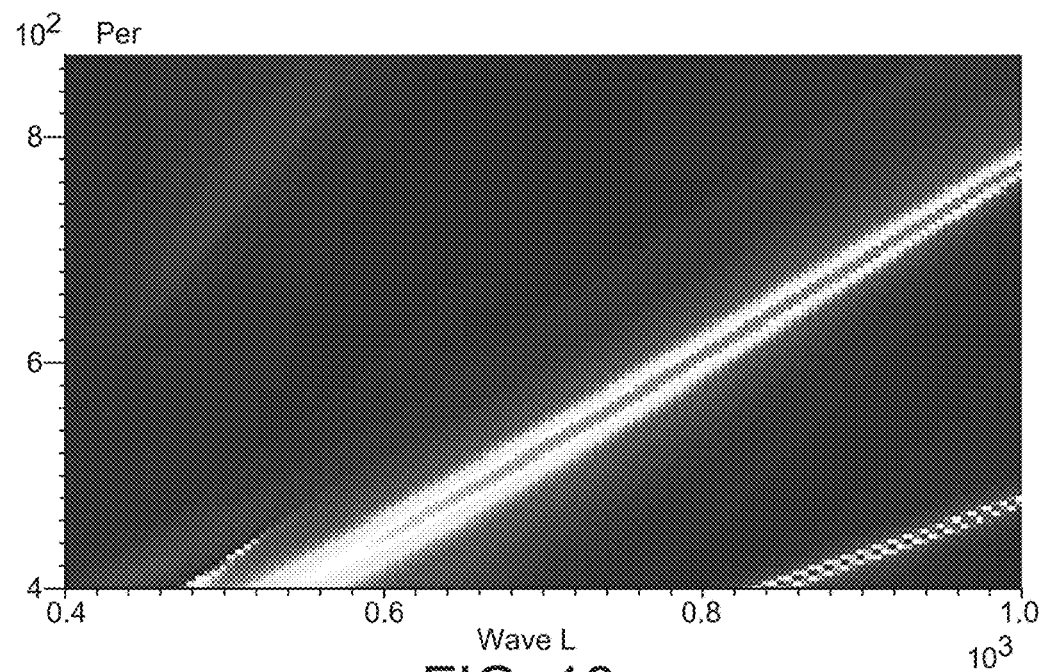
FIG. 19: A diagram to illustrate the diffraction intensity as a function of wavelength and grating period in the case of transverse electric polarization.
Figure 20:
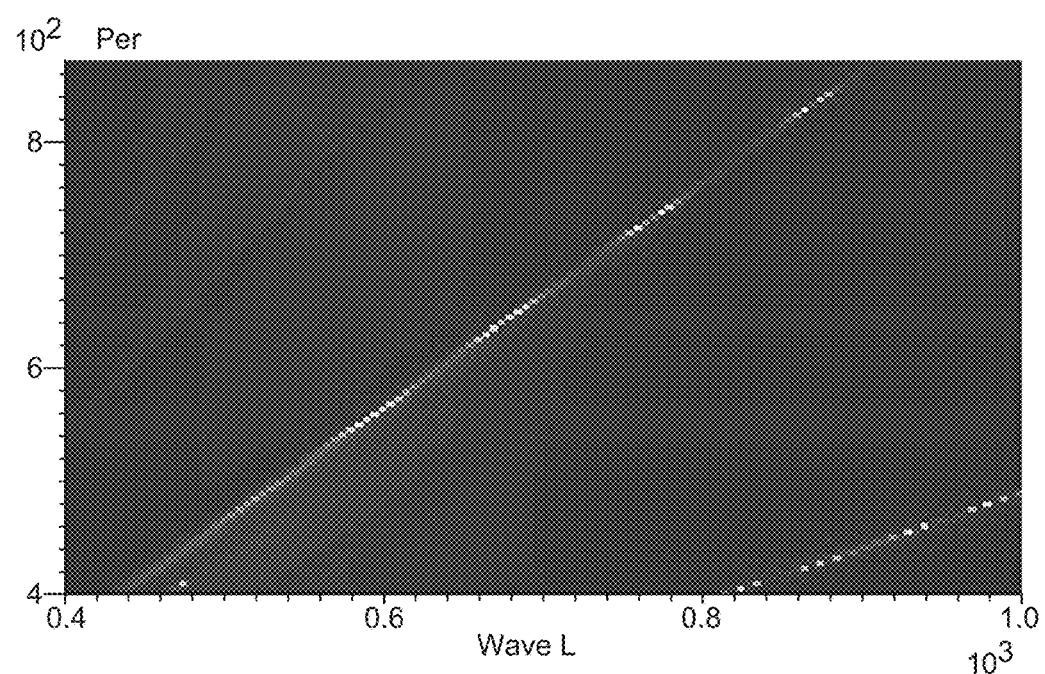
FIG. 20: A diagram to illustrate the diffraction intensity as a function of wavelength and grating period in the case of transverse magnetic polarization.

The reflection behavior of a specific embodiment example is shown in FIGS. 19 and 20 as a function of grating period and wavelength in the case of transverse electric and transverse magnetic polarization. The grating depth of the sinusoidal grating is 200 nm. The grating is provided with a layer made from ZnS which is 80 nm thick with a refractive index of approx. 2.3 in the visible spectral range (real part of the complex refractive index), wherein the grating is embedded in polymer with a refractive index of approx. 1.59. The observation angle is 25°.

It can be recognized that a grating with a period of 700 nm in the case of transverse electric polarization shows clear characteristic reflection in the near infrared range, which can be used for an authentication.

It is further possible to use motifs 11 which display dynamic or static mat effects in front of a diffractive black background, a reflectively black or colored background. Such structures can be evaluated as described above with image recognition and edge detection algorithms. The size of the structures, dots in the simplest case, is preferably 100 µm to 600 µm. The structures can also differ from the background by small deviations in the azimuth angle. The more elements with such an effect are integrated into the motif 11, the better the accuracy of the authentication is.

Figure 21:
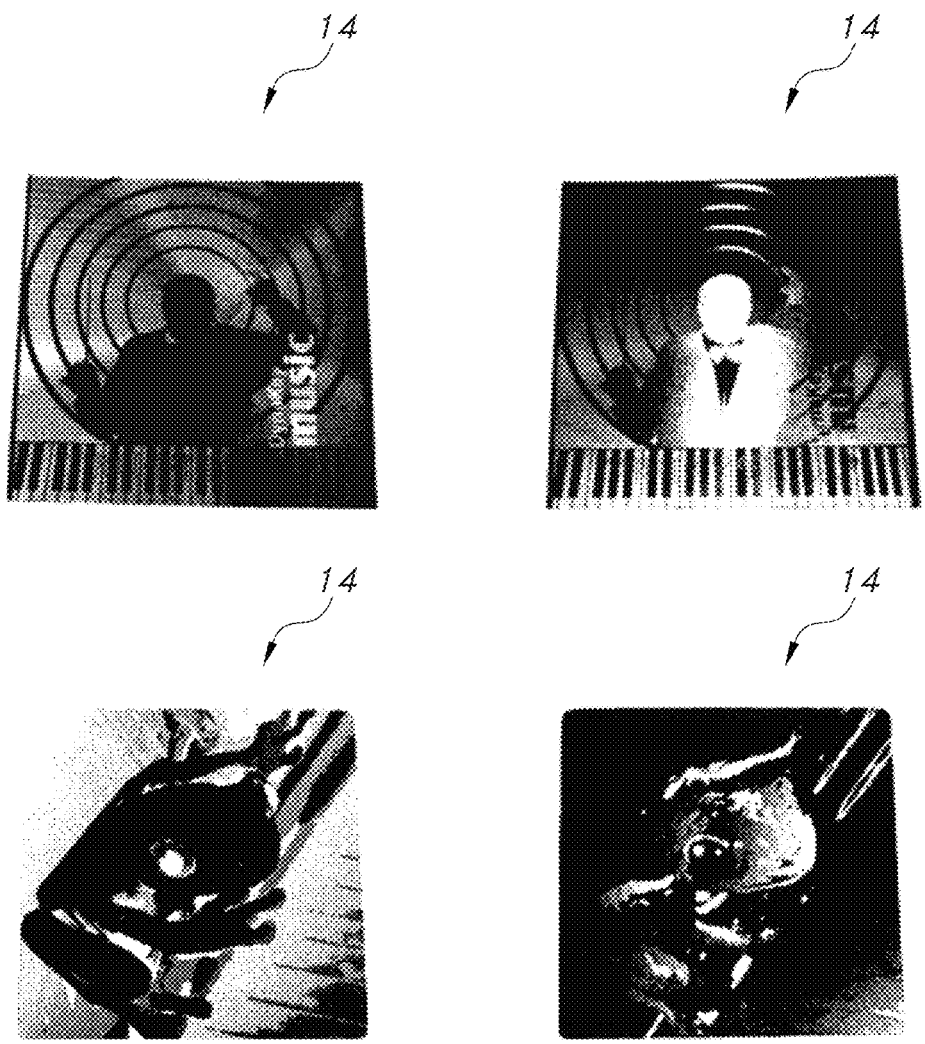
FIG. 21: A schematic representation of a security element with an anisotropic mat structure.

The motif 11 with the so-called dynamic mat effect can also, optionally, be chosen to have a large surface area, with the result that the mat effect is clearly recognizable to the eye. In the authentication, if an image sequence is captured here with at least one image with and one image without flash, the contrast inversion which occurs at least in regions can be evaluated. This contrast inversion is caused by the specific scatter characteristic of anisotropic mat structures which are used for this dynamic mat effect. With flash, the motif 11 is illuminated from almost the same direction as that from which it is also captured using the sensor. Without flash, on the other hand, very little light comes from this direction, so the illumination takes place from other directions. In combination, this results in a contrast inversion of the motif 11. FIG. 21 shows the image captures with and without flash for two example motifs produced with anisotropic mat structures.

The motif 11 can further comprise a portrait, which can be realized by means of a grayscale image, true-color hologram, computer-generated hologram or as a surface relief portrait. A biometric algorithm can then be used to authenticate the security element 1. In particular, portrait variants which are highly rich in detail are suitable for this.

The motif 11 can also be extended in terms of software in the device 3 by further elements, whereupon it is then checked whether a target structure results. Thus, cryptographic methods can be integrated into the method, wherein the elements extended in terms of software act as private key and the motif acts as public key.

The structures of the motif 11 used to verify the security element 1 can also carry meaning, for example in the form of a linear code or barcode. If these structures are very small, for example smaller than 100 µm, they are, in turn, not visible to the naked eye, but can be recognized by the sensor 31. If diffractive structures are used for this, for example a diffractive barcode with relief structures which strongly absorb light and thus have an optically dark, preferably black, effect on a background with isotropic mat relief structures, the device 3 can differentiate between the genuine security element and a static printed copy without problems. For this, for example, the colors, intensity or the grid structure of the diffractive code can be used.

The structures of the motif 11 which carry meaning can be an integral graphical component of the motif 11. That is to say, the structures of the motif 11 which carry meaning are at the same time part of a graphical representation, for example a logo, emblem, portrait or denomination. The structures of the motif 11 which carry meaning can, however, also be arranged separately, i.e. optically distinct from the actual graphical motif in a separate region, in order that they can also be separately readable or verified, for example. For example, alongside the motif 11, in particular neighboring it, a diffractive barcode can be arranged. As an alternative to this, the diffractive barcode can be integrated into the graphical arrangement of the motif 11.

Three possible embodiments of a security element 1 with a motif 11 comprising a 2D barcode 111 are represented in FIGS. 22 A-C. All embodiment examples comprising in each case the barcode 111, a graphical motif 112, for example a brand logo, as well as an at least partially metalized surface 113. In all embodiment examples, the graphical motif 112 is formed as a diffractive motif arranged on the partially metalized surface 113.

Figure 22A:
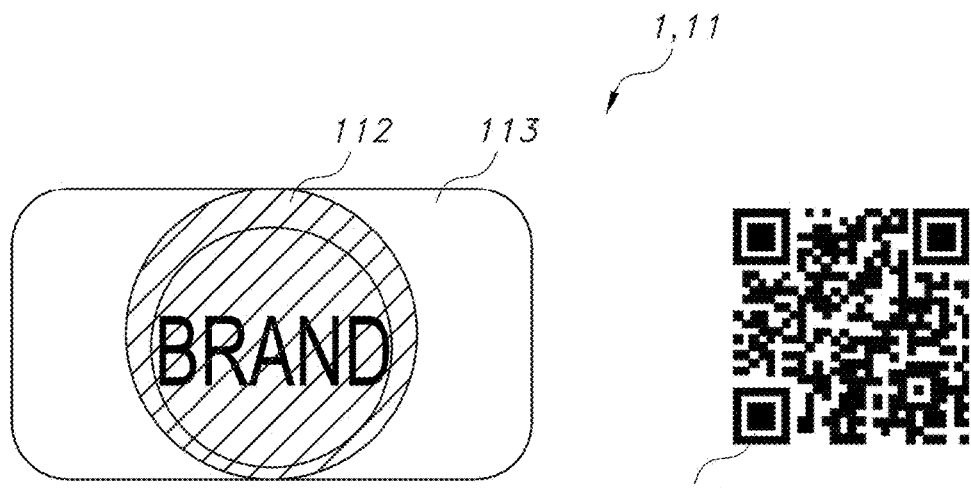
FIG. 22 A-C: A schematic representation of three alternative embodiments of a security element with two-dimensional barcode.

In the embodiment example shown in FIG. 22A, the barcode 111 does not extend over the partially metalized surface 113, but is arranged as a printed structure alongside this partially metalized surface 113.

Figure 22B:
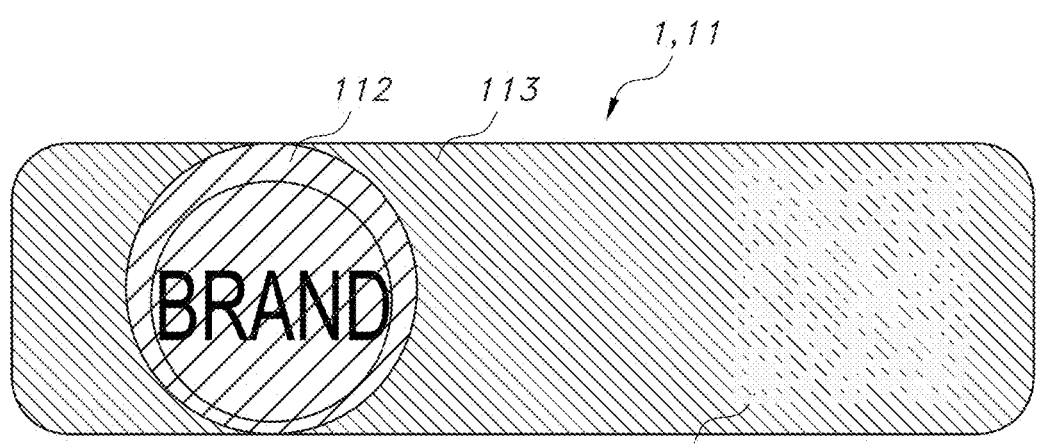

In the embodiment example according to FIG. 22B, the barcode 111 lies inside the surface 113 and is generated by targeted demetalization of the surface 113, for example by means of laser ablation.

Figure 22C:
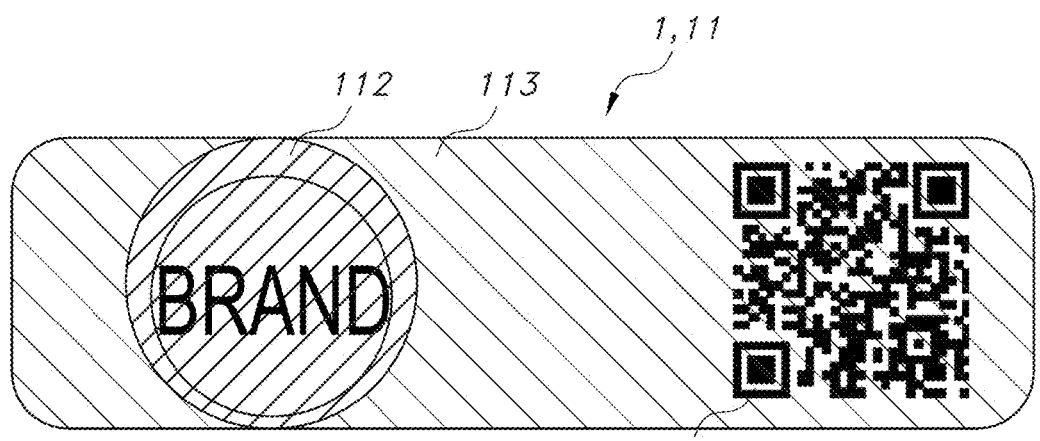

In the embodiment example according to FIG. 22C the barcode 111 is likewise arranged within the surface 113 and, as with the graphical motif 112, is realized as a diffractive structure.

In all cases, the barcode 111 can be read using the described method by means of a hand-held device 3, with the result that the security element 1 can be authenticated. The barcode 111 itself can also contain items of individualization information, which make the allocation of the security element 1 to a specific object or document possible. This is possible in particular if the barcode 111 is generated by ink-jet printing or laser ablation.

Such items of individualization information can, however, also be introduced into the security element 1 in addition to the barcode 111. Three possibilities for this are represented in FIGS. 23 A-C.

Such additional items of individualization information 114 can, like the barcode 111, be read by means of a hand-held device 3. In order to ensure additional security, it is also possible for the items of individualization information 114 to be readable only with specific devices, for example with specific illumination or specific camera filters or a specific configuration in terms of software.

In the embodiment examples shown, the item of individualization information 114 is formed as a random or pseudorandom dot pattern. Random numbers or pseudorandom numbers for generating the dot pattern can be obtained from physical sources, for example from random distributions occurring in nature, or also be generated algorithmically.

Figure 23A:
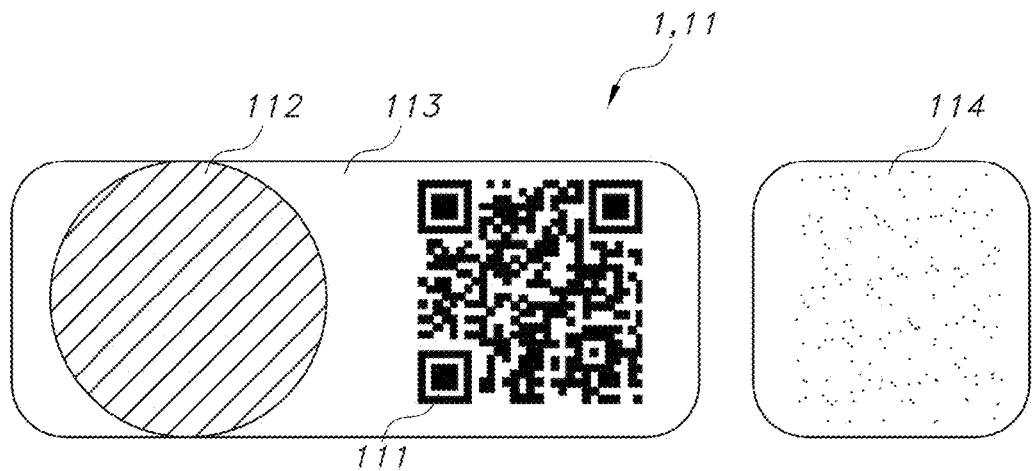
FIG. 23 A-C: A schematic representation of three alternative embodiments of a security element with two-dimensional barcode and an individualized random code.

As shown by FIG. 23A, the item of individualization information 114 can be arranged separately from the barcode 111. For example, barcode 111 and item of individualization information 114 can be generated on separate transfer films and be applied to the security element 1 separated from each other.

Figure 23B:
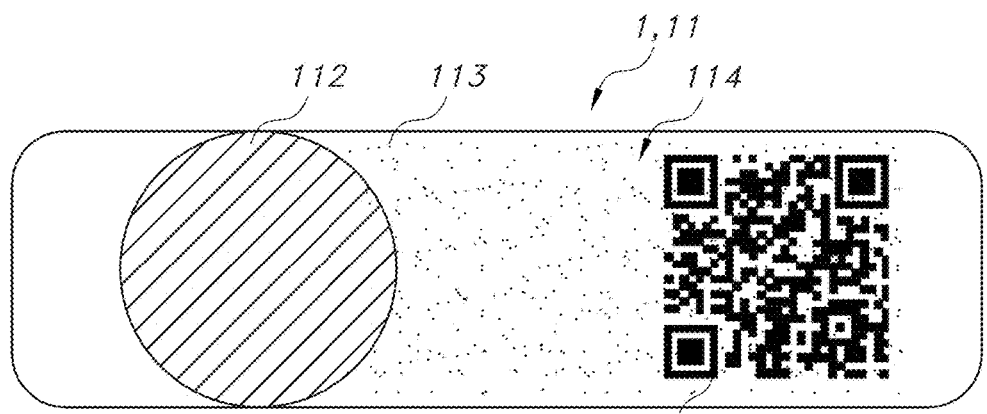

Alternatively, barcode 111 and item of individualization information 114 can also overlap. As shown by FIG. 23B, this can be brought about by direct integration of the item of individualization information 114 into the structure of the barcode 111. For example, both items of information can be formed by the same diffractive structure.

Figure 23C:
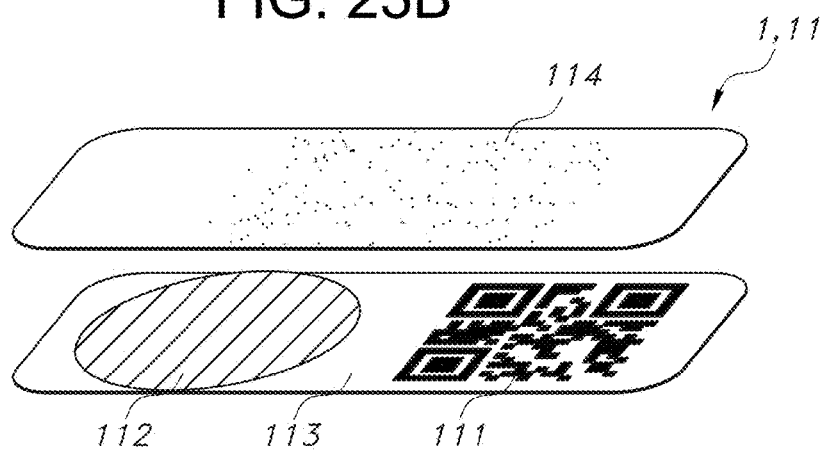

Alternatively, barcode 111 and item of individualization information 114 can also be applied sequentially, as shown in FIG. 23C. For example, the barcode 111 is applied here by means of a transfer film and then the item of individualization information 114 is printed over it. Alternatively, the item of individualization information 114 can also be generated by introducing randomly distributed particles, fibers or other markers into the transfer film.

If the barcode 111 is formed as a relief structure which is cast by replication into a replication layer and then metalized, the item of individualization information 114 can further also be generated by subsequent partial demetalization of the metal layer 113, for example by laser ablation.

Furthermore, it is also possible to combine a random item of individualization information 114 with a further random relief structure. All variants already described above can be used as relief structures; isotropic or anisotropic mat structures, grids which are linear, crossed, in the form of wavy lines or circular, microstructure-based color structures such as computer-generated holograms or random color structures, kinoform structures or the like are particularly suitable here. An additional individualization can then take place again by applying an item of individualization information 114 by means of laser ablation or printing, in particular ink-jet printing.

Figure 24A:
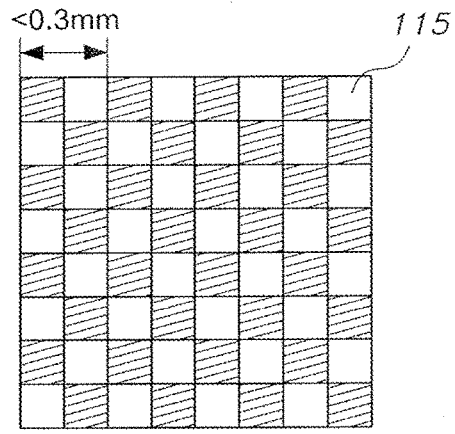
FIG. 24 A-C: A schematic representation of a superimposition of a diffractive code and a random item of individualization information.
Figure 24B:
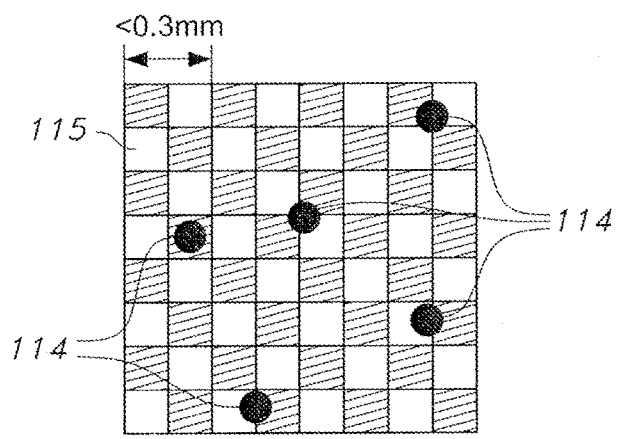
Figure 24C:
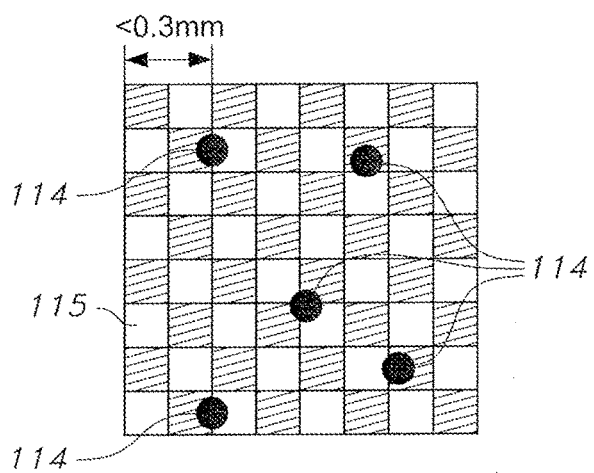

As shown by FIG. 24, it is advantageous if the background to the item of individualization information 114 is formed by a mosaic or a superimposition of relief structures which can be differentiated by means of the hand-held device 3. The individual fields 115 of such a mosaic are preferably small enough that they cannot be resolved by the human eye. If the item of individualization information 114, as shown in FIGS. 24 A-C, is inscribed after generation of the mosaic for example by laser ablation in the form of individual dots, merely through the tolerance of the manufacturing process which is necessarily present, a random deviation in the positioning of the item of individualization information 114 relative to the fields 115 of the mosaic results, which differs for each security element 1 and can thus be used to identify individual security elements 1.

Furthermore, an item of individualization information 114 can be generated by partially destroying a relief structure by printing on a lacquer with the same refractive index as the replication layer into which the relief structure is molded. Where the lacquer was printed on, no optical effect results from the destroyed relief structure; after a subsequent metalization these regions therefore have a mirroring appearance and can be read easily by the hand-held device 3.

Figure 25:
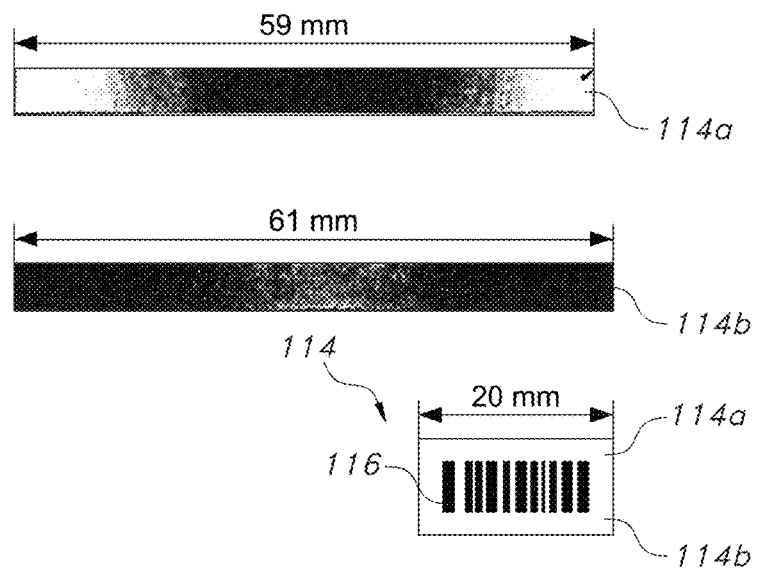
FIG. 25: A schematic representation of an item of individualization information with two neighboring diffractive structures which vary over their lengths.

An item of individualization information 114 can, as shown in FIG. 25, be further generated in that two strip-shaped optically variable structures which in each case vary along their length in at least one parameter are arranged next to each other or one on top of the other. By varying the respective parameters, from the arrangement of the two structures relative to each other, a specific pair of parameters results in each case for each point along the length.

For example, a dynamic mat structure 114a which varies in its lightness, for example with a gradual change of the azimuth angle from 0° to 90°, can be arranged alongside a diffractive color progression 114b, for example with a gradual change in the grating period from 500 lines per mm to 1500 lines per mm. For each point along the length, a pair of values of color and lightness can then be read. Through an offset in the longitudinal direction, selected when the two structures are applied, these pairs of values can be individualized and used to recognize specific individual security elements 1. The two structures can furthermore also be superimposed with a random pattern 116, which defines zones to be read.

Figures 26, 27:
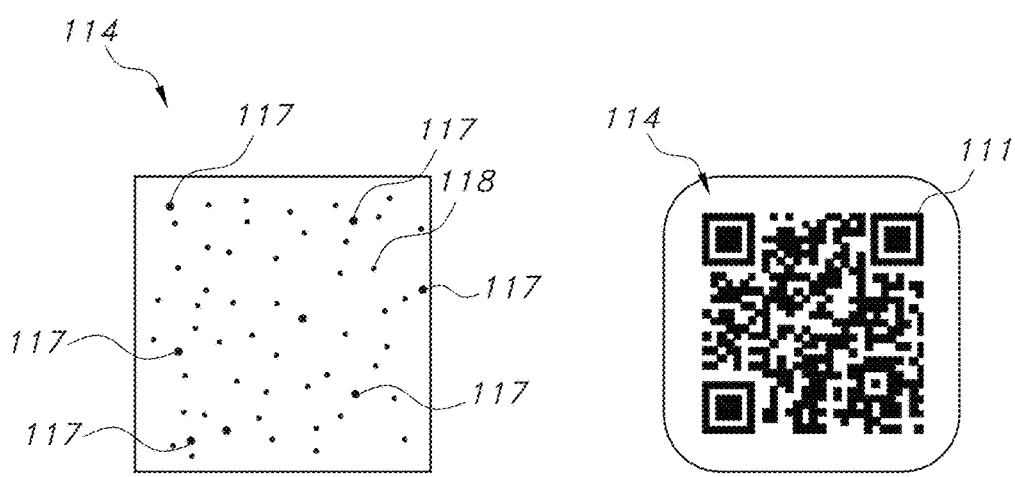
FIG. 26: A schematic representation of a further superimposition of a diffractive code and a random item of individualization information.
FIG. 27: A schematic representation of a superimposition of a printed code and a random item of individualization information.

In a further embodiment, markers 117 in the form of dots can be integrated into a diffractive background pattern 118 in order to form the item of individualization information 114, as represented in FIG. 26. The markers can, in general, be any chemical or physical markers, in particular pigments, nanoparticles, crystalline particles and the like. For additional protection, the absorption, emission or refraction spectra of the markers 117 can also be analyzed using the hand-held device 3.

The markers are preferably randomly distributed. This can take place, for example, by admixing a small concentration of markers 117 into a lacquer. When the lacquer is applied and cured, the desired random distribution results, which can be used for individualization.

If a barcode 111 is printed over an individualization pattern 114, the partial coverage and thus destruction of the individualization pattern 114 by the barcode 111 can also be used to authenticate and identify the security element 1. An example of this is shown by FIG. 27. The positional relationship between individual structures of the individualization pattern 114 and the barcode 111 can also be read and analyzed. FIG. 28 shows a further example of an individualization pattern 114. Here, a diffractive individualization pattern 114 is first replicated on a strip-shaped substrate (FIG. 28A). The maximum length of the strip which is free of repetition is determined by the circumference of the replication roller.

Only a part of this strip is then applied to the security element 1 alongside the barcode 111. As FIGS. 28 B-D show, an individual positional relationship which can be read and used for authentication thus results between the individualization pattern 114 and the barcode 111 depending on the section of the strip chosen.

The invention claimed is:

1. A method for authenticating an optically variable security element comprising:
   a) capturing an image sequence with at least one individual image of the security element by means of a hand-held sensor device;
   b) checking whether at least one predetermined item of optical information is present in at least one individual image of the image sequence,
   wherein the image sequence comprises more than two individual images of the security element, and wherein at least two individual images of the image sequence are used to check whether the security element comprises an optically variable structure, and
   wherein the optically variable security element comprises at least one predetermined item of optical information automatically detected by the hand-held sensor device, the at least one predetermined item of optical information being formed by a variation of at least one relief parameter of a relief structure of the security element between at least one first zone and at least one second zone of the security element, wherein the relief structure provided in the first and/or second zone is a grating with grating lines which are curved circularly, parabolically or in the form of wavy lines, with a periodic azimuthal variation, wherein in at least one of the partial regions the period of the azimuthal variation and/or the grid width of the one- or two-dimensional grid is less than 300 µm.

2. A method according to claim 1, wherein each individual image has more than 1920×1280 pixels.

3. A method according to claim 1, wherein in step b) it is first checked whether a predetermined object is present in at least one individual image of the image sequence.

4. A method according to claim 3, wherein an image recognition algorithm, is used to check whether the predetermined object is present.

5. A method according to claim 3, wherein, to check whether the predetermined object is present, a comparison of the at least one individual image with a previously acquired training data set is carried out by means of the image recognition algorithm.

6. A method according to claim 5, wherein, to acquire the training data set, a plurality of images is created, wherein a first subset of the images in each case has the predetermined object and a second subset of the images in each case does not have the predetermined object, and wherein each image of the first subset is allocated respective image coordinates of features to be recognized of the predetermined object.

7. A method according to claim 6, wherein using the first and second subsets as well as the allocated respective image coordinates, a training of the image recognition algorithm is carried out.

8. A method according to claim 3, wherein during the check of whether the at least one predetermined item of optical information of the optically variable security element is present, a contour of the predetermined object is ascertained from at least one individual image of the image sequence.

9. A method according to claim 8, wherein, an edge detection algorithm, is executed to ascertain the contour.

10. A method according to claim 9, wherein, during the execution of the edge detection algorithm, a noise filtering is carried out, by means of a Gaussian filter with a kernel size of from 3 to 7.

11. A method according to claim 9, wherein, during the execution of the edge detection algorithm, an edge detection is carried out by applying a Sobel operator in at least one preferred direction of the at least one individual image, in two orthogonal directions of the at least one individual image.

12. A method according to claim 9, wherein, during the execution of the edge detection algorithm, an edge filtering is carried out.

13. A method according to claim 9, wherein, during the execution of the edge detection algorithm, a threshold-based ascertaining of the image coordinates of the contour of the object is carried out.

14. A method according to claim 13, wherein based on the ascertained image coordinates of the contour, at least one individual image of the image sequence is divided into at least two partial regions and for each partial region the ascertained image coordinates of the contour are compared with corresponding target coordinates and, from this, a presence and/or a size and/or a relative position of predetermined contours is ascertained.

15. A method according to claim 8, wherein at least one partial region of the individual image, which is positioned in a predetermined location relative to the contour of a predetermined object, and which comprises at least one pixel and/or at least one pixel group of the individual image, is selected and at least one property of the at least one pixel and/or of the at least one pixel group of the at least one selected partial region is compared with a corresponding target value.

16. A method according to claim 15, wherein a location of the at least one partial region of the individual image is determined using the ascertained image coordinates of the contour.

17. A method according to claim 15, wherein the at least one partial region comprises less than 50% of a surface area of the individual image.

18. A method according to claim 1, wherein, during the capture of the image sequence in step a), an angle between the sensor and the security element and/or an angle between a light source and the security element is changed.

19. A method according to claim 1, wherein, during the capture of the image sequence in step a), by means of a position sensor of the hand-held sensor device, for each individual image of the image sequence, a relative position of the hand-held sensor device with respect to a predetermined position is recorded and allocated to the respective individual image.

20. A method according to claim 18, wherein, to check whether the security element comprises an optically variable structure, in step b) two individual images of the image sequence which have been captured at different observation and/or illumination angles are compared.

21. A method according to claim 18, wherein, to check whether the security element comprises an optically variable structure, in each case corresponding pixels and/or pixel groups, of partial regions, of the individual images are compared.

22. A method according to claim 21, wherein it is checked whether respective pixels and/or pixel groups, of the partial regions, of the individual images differ in terms of a color value and/or lightness value.

23. A method according to claim 21, wherein the predetermined item of optical information comprises one or more items of information selected from: object, contour of the object, part of the contour of the object, properties of pixels and/or pixel group of the at least one selected partial region.

24. A method according to claim 21, wherein one or more items of information selected from: object, contour of the object, part of the contour of the object, properties of pixels and/or pixel group of the at least one selected partial region, are compared with target values, in order to ascertain whether the predetermined item of optical information is present.

25. A method according to claim 1, wherein the at least one predetermined item of optical information is or comprises a visually recognizable item of information.

26. A method according to claim 1, wherein the at least one predetermined item of optical information is or comprises a symbol, logo, image, sign, alphanumeric character or a number.

27. A method according to claim 1, wherein the at least one predetermined item of optical information is or comprises a partial element of a symbol, logo, image, sign, alphanumeric character or a number.

28. A method according to claim 1, wherein the at least one predetermined item of optical information is present in addition to a further optical, visually perceptible item of information of the diffractive security element in the form of a symbol, logo, image, sign, alphanumeric character or a number.

29. A method according to claim 1, wherein the at least one predetermined item of optical information is or comprises a pixel arrangement and/or a line arrangement and/or a relative position of a pixel arrangement and/or a line arrangement with respect to a further optical, visually perceptible item of information of the optically variable security element, in the form of a symbol, logo, image, sign, alphanumeric character or a number.

30. A method according to claim 1, wherein the at least one predetermined item of optical information is or comprises a deviation of a graphical property, a line thickness, a color value, a tonal value, a lightness, a grid density, a grid alignment or a typeface, between a first partial region and a second partial region of a further optical, visually perceptible item of information of the optically variable security element, the further optical visually perceptible item of information comprising a symbol, logo, image, sign, alphanumeric character or a number.

31. A method according to claim 1, wherein the at least one predetermined item of optical information is or comprises a deviation from a symmetry between a first partial region and a second partial region of a further optical, visually perceptible item of information of the optically variable security element, the further optical visually perceptible item of information comprising a symbol, logo, image, sign, alphanumeric character or a number.

32. A method according to claim 1, wherein the at least one predetermined item of optical information is or comprises an item of information which is visually non-recognizable and which can be detected automatically using the hand-held sensor device.

33. A method according to claim 32, wherein the at least one predetermined item of optical information is formed by a variation of at least one relief parameter of a relief structure of the security element between at least one first zone and at least one second zone of the security element, wherein the relief structure provided in the first and/or second zone is a diffractive structure, a zero-order diffraction structure, a blazed grating, a macrostructure, a lens structure or microprism structure, a mirror surface, a mat structure, an anisotropic or isotropic mat structure.

34. A method according to claim 33, wherein at least one lateral dimension of the at least one first and/or of the at least one second zone is less than 600 μm.

35. A method according to claim 33, wherein the at least one first zone comprises a symbol, logo, image, sign, alphanumeric character or a number and the at least one second zone forms a background for the at least one first zone.

36. A method according to claim 33, wherein the first and second zones are gridded in each other at a predetermined grid period.

37. A method according to claim 33, wherein the at least one grating parameter is a spatial frequency, an azimuth angle, a relief depth, a relief shape, a phase of the relief structure, a period of an azimuthal variation, a relief depth variation and/or a spatial frequency variation of a one- or two-dimensional grating, an average roughness of a mat structure, the preferred direction of an anisotropic mat structure.

38. A method according to claim 1, wherein the at least one predetermined item of optical information is generated during the capture of the image sequence through a Moiré effect between a periodic grid of the security element and a periodic grid of the hand-held sensor device.

39. A method according to claim 1, wherein the at least one predetermined item of optical information is generated by a diffractive effect in a wavelength range outside a visible spectrum, in an infrared range.

40. A method according to claim 39, wherein the diffractive effect is generated by a zero-order diffractive structure, a sinusoidal grating or binary grating with a transparent layer made from ZnS.

41. A method according to claim 1, wherein, to check whether the at least one predetermined item of optical information is present, a grid filter and/or a color filter is applied to the at least one individual image of the image sequence.

42. A method according to claim 1, wherein the at least one predetermined item of optical information forms a diffractive barcode.

43. A method according to claim 1, wherein it is checked whether at least one further item of optical information is present in at least one individual image of the image sequence.

44. A method according to claim 43, wherein the at least one further item of optical information is an item of individualization information.

45. A method according to claim 44, wherein the item of individualization information is formed by a distance of at least one image element of the at least one item of optical information from at least one image element of the at least one further item of optical information.

46. A method according to claim 44, wherein the item of individualization information is formed by a barcode.

47. A method according to claim 43, wherein the at least one further item of optical information is superimposed on the at least one predetermined item of optical information.

48. A method according to claim 43, wherein the at least one further item of optical information comprises one or more structures from the following groups:
  relief structures, a diffractive structure, a zero-order diffraction structure, a blazed grating, a macrostructure, a lens structure or microprism structure, a mirror surface, a mat structure, an anisotropic or isotropic mat structure,
  printed structures, comprising colored, optically active and/or optically variable dyes and/or pigments
  magnetic structures,
  partially metalized layers and/or partial HRI layers.

49. A method according to claim 1, wherein the at least one predetermined item of optical information is a portrait which is recognized in step b) by means of a biometric algorithm.

50. A method according to claim 1, wherein, before and/or during the capture of the image sequence in step a), instructions are displayed to a user of the hand-held sensor device on a display of the hand-held sensor device about a relative position with respect to the security element and/or a distance from the security element at which the hand-held sensor device is to be held and/or moved during the capture of the image sequence.

51. A method according to claim 1, wherein, in step a), the individual images of the image sequence are captured at a resolution of at least 0.5 line pairs/mm.

52. A method according to claim 1, wherein, before the capture of the individual images in step a), an illumination level is measured and if the illumination level is less than 800 lx, a light source of the hand-held sensor device is activated.

53. A method according to claim 1, wherein, when the at least one predetermined item of optical information is present, an authentication confirmation is output on a display.

54. A method according to claim 1, wherein, if the at least one item of optical information is not present in step b), a notification which comprises an item of position and/or time information is conveyed to a computing device, which is different from the hand-held sensor device.

55. A method according to claim 1, wherein, in a further step c), it is checked whether at least one further predetermined item of optical information is present in at least one individual image of the image sequence which is present in a known forgery of the optically variable security element and is not present in a genuine optically variable security element.

56. A method according to claim 55, wherein, when the at least one predetermined item of optical information is not present and the at least one further predetermined item of optical information is not present, a notification which comprises an item of position and/or time information, as well as at least one individual image of the image sequence, is conveyed to the computing device, which is different from the hand-held sensor device.

57. An optically variable security element for authentication by means of a smartphone or PDA, the optically variable security element comprising at least one predetermined item of optical information which can be automatically detected using a sensor of the smartphone or PDA,
  wherein the at least one predetermined item of optical information is formed by a variation of at least one relief parameter of a relief structure of the security element between at least one first zone and at least one second zone of the security element, wherein the relief structure provided in the first and/or second zone is a grating with grating lines which are curved circularly, parabolically or in the form of wavy lines, with a periodic azimuthal variation, wherein in at least one of the partial regions the period of the azimuthal variation and/or the grid width of the one- or two-dimensional grid is less than 300 µm.

58. An optically variable security element according to claim 57, wherein the periodic azimuthal variation covers a range of +/−30° about an average azimuth angle.

59. An optically variable security element for authentication by means of a smartphone or PDA, the optically variable security element comprising at least one predetermined item of optical information which can be automatically detected using a sensor of the smartphone or PDA,
  wherein the at least one predetermined item of optical information is formed by a variation of at least one relief parameter of a relief structure of the security element between at least one first zone and at least one second zone of the security element, wherein the relief structure provided in the first and/or second zone is a grating, and wherein the at least one relief parameter is a spatial frequency, the spatial frequency of the grating being between 1000 lines/mm and 500 lines/mm.

60. An optically variable security element according to claim 57, wherein a phase of the periodic azimuthal variation is shifted by 180° between the first and second partial region.

61. An optically variable security element according to claim 59, wherein the relief structure has a spatial frequency in the first zone which differs from the spatial frequency of the second zone by at least 100 lines/mm.

62. An optically variable security element for authentication by means of a smartphone or PDA, the optically variable security element comprising at least one predetermined item of optical information which can be automatically detected using a sensor of the smartphone or PDA,
  wherein the at least one predetermined item of optical information is generated by a diffractive effect in a wavelength range outside a visible spectrum, in an infrared range, wherein the diffractive effect is generated by a zero-order diffractive structure with a transparent layer made from a highly refractive ZnS material, wherein the zero-order diffractive structure is a sinusoidal grating with a grating depth of 100-300 nm.

63. An optically variable security element according to claim 62, wherein the layer made from a highly refractive material has a thickness of 60-100 nm, and/or has a refractive index of between 1.5 and 2.5.

64. An optically variable security element according to claim 59, wherein an optical effect generated by the relief structure has, at least in regions, a parallax in two spatial directions which are orthogonal to each other.

65. A method for authenticating an optically variable security element comprising:
  a) capturing an image sequence with at least one individual image of the security element by means of a hand-held sensor device;
  b) checking whether at least one predetermined item of optical information is present in at least one individual image of the image sequence, wherein the image sequence comprises more than two individual images of the security element, and wherein at least two individual images of the image sequence are used to check whether the security element comprises an optically variable structure, and wherein the optically variable security element comprises at least one predetermined item of optical information automatically detected by the hand-held sensor device, the at least one predetermined item of optical information being formed by a variation of at least one relief parameter of a relief structure of the security element between at least one first zone and at least one second zone of the security element, wherein the relief structure provided in the first and/or second zone is a grating, and wherein the at least one relief parameter is a special frequency the spatial frequency of the grating being between 1000 lines/mm and 500 lines/mm.

66. A method for authenticating an optically variable security element comprising:
  a) capturing an image sequence with at least one individual image of the security element by means of a hand-held sensor device;
  b) checking whether at least one predetermined item of optical information is present in at least one individual image of the image sequence, wherein the image sequence comprises more than two individual images of the security element, and wherein at least two individual images of the image sequence are used to check whether the security element comprises an optically variable structure, and wherein the optically variable security element comprises at least one predetermined item of optical information automatically detected by the hand-held sensor device, wherein the at least one predetermined item of optical information is generated by a diffractive effect in a wavelength range outside the visible spectrum, in the infrared range, wherein the diffractive effect is generated by a zero-order diffractive structure with a transparent layer made from a highly refractive ZnS material, wherein the zero-order diffractive structure is a sinusoidal grating with a grating depth of 100-300 nm.

67. An optically variable security element according to claim 57, wherein at least one lateral dimension of the at least one first and/or of the at least one second zone is less than 600 pm.

68. An optically variable security element according to claim 67, wherein the at least one first zone comprises a symbol, logo, image, sign, alphanumeric character or a number and the at least one second zone forms a background for the at least one first zone.

69. An optically variable security element according to claim 57, wherein the first and second zones are gridded in each other at a predetermined grid period.

* * * * *